United States Patent
Chun et al.

(10) Patent No.: US 7,442,752 B2
(45) Date of Patent: Oct. 28, 2008

(54) NOBONENE-ESTER BASED ADDITION POLYMER AND METHOD FOR PREPARING THE SAME

(75) Inventors: Sung-Ho Chun, Daejeon (KR); Won-Kook Kim, Daejeon (KR); Sung-Cheol Yoon, Daejeon (KR); Tae-Sun Lim, Daejeon (KR); Heon Kim, Daejeon (KR); Kyoung-Hoon Kim, Daejeon (KR); Jung-Min Lee, Daejeon (KR); Kyung-Lim Paik, Daejeon (KR); Sang-Doo Ahn, Daejeon (KR)

(73) Assignee: LG Chem, Ltd. (KR)

( * ) Notice: Subject to any disclaimer, the term of this patent is extended or adjusted under 35 U.S.C. 154(b) by 9 days.

(21) Appl. No.: 10/494,872

(22) PCT Filed: Jul. 7, 2003

(86) PCT No.: PCT/KR03/01349

§ 371 (c)(1),
(2), (4) Date: May 7, 2004

(87) PCT Pub. No.: WO2004/007587

PCT Pub. Date: Jan. 22, 2004

(65) Prior Publication Data

US 2005/0010006 A1    Jan. 13, 2005

(30) Foreign Application Priority Data

Jul. 10, 2002    (KR) ...................... 10-2002-0040044

(51) Int. Cl.
C08F 10/14    (2006.01)
(52) U.S. Cl. ...................... 526/281; 525/210
(58) Field of Classification Search ................. 526/281; 525/210
See application file for complete search history.

(56) References Cited

U.S. PATENT DOCUMENTS

| | | | |
|---|---|---|---|
| 3,330,815 A | 7/1967 | McKeon et al. | |
| 4,831,172 A | 5/1989 | Hahn et al. | |
| 5,011,730 A | 4/1991 | Tenney et al. | |
| 5,179,171 A | 1/1993 | Minami et al. | |
| 5,705,503 A | 1/1998 | Goodall et al. | |
| 6,455,650 B1 | 9/2002 | Lipian et al. | |
| 2002/0040115 A1 | 4/2002 | Sen et al. | 526/171 |
| 2002/0052454 A1 | 5/2002 | Lipian et al. | 526/171 |

FOREIGN PATENT DOCUMENTS

| | | | |
|---|---|---|---|
| EP | 0445755 A2 | 3/1991 | |
| EP | 0 729 480 B1 | 1/1999 | |
| EP | 1 096 318 A1 | 5/2001 | |
| EP | 1 111 466 A1 * | 6/2001 | |
| EP | 1 113 027 A1 | 7/2001 | |
| EP | 1 132 774 A2 * | 9/2001 | |
| EP | 1 191 061 A1 | 3/2002 | |
| JP | 56-167640 | 12/1981 | |
| JP | 2000508080 | 6/2000 | |
| JP | 2001-519821 | 10/2001 | |
| JP | 2001516804 | 10/2001 | |

OTHER PUBLICATIONS

Breunig et al., Makromol. Chem. 193, 2915-2927 (1992).*
Hennis et al., Organometallics 2001, 20 2802-2812.*
"Novel, Efficient, Palladium-Based System for the Polymerization of Norbornene Derivatives: Scope and Mechanism"; Authors: April P. Hennis, et al.; American Chemical Society, Organometallics; vol. 20; 2001; pp. 2802-2812.
Sen. A., et al; "Catalysis by Solvated Transition-Metal Cations. Novel Catalytic Transformations of Alkenes by Tetrakis (acteonitrile) palladium Ditetrafluoroborate. Evidence for the Formation of Incipient Carbonium Ions as Intermediates"; J. Am. Chem. Soc.; vol. 103; pp. 4627-4929; 1981.
Gaylord, N., et al.; "Poly-2-3 and 2,7-Bicyclo[2.2.1]hept-2-enes: Preparation and Structures of Polynorbornenes"; J. Macromol. Sci.-Chem., A11; vol. 5; pp. 1053-1070; 1977.
Mathew, J.P., et al.; "(n3-Allyl)palladium(II) and Palladium (II) Nitrile Catalysts for the Addition Polymerization of Norbornene Derivatives with Functional Groups"; Macromolecules; vol. 29; pp. 2755-2763; 1996.
Vernyi, B.; "DuPont Co. announces catalysts for polyolefins"; Plastic News; pp. 1 and 25; Feb. 5, 1996.
Kaminsky, W., et al; "Polymerization of Cyclic Olefins with Homogenous Catalysts"; Stud. Surf. Catal.; vol. 56; pp. 425-438; 1990.
"Hoechst AG, Mitsui to make cyclo-olefins"; Plastic News; p. 24; Feb. 27, 2005.

* cited by examiner

Primary Examiner—Robert D. Harlan
(74) Attorney, Agent, or Firm—Cantor Colburn LLP

(57) ABSTRACT

The present invention relates to a norbornene based addition polymer, and more particularly to an addition polymer of norbornene based monomers containing an ester group. The present invention provides a norbornene-ester based addition polymer having a molecular weight (Mn) larger than 20,000 and comprising a norbornene-ester based monomer comprising more than 50 mol % of exo norbornene-ester monomer as a repeating unit, a method for preparing the same, and an optically anisotropic film comprising the same. The norbornene-ester based addition polymer of the present invention is transparent, has a low dielectric constant, has good thermal stability and strength, leaves no unwanted materials when attached to metals or other polymers, and has good adhesivity, so that it can be used for optical films, retardation films, plastic substrate materials, transparent polymers such as POF or PCB, insulating materials, or insulating electronic devices such as PCB or insulating materials.

25 Claims, 1 Drawing Sheet

NOBONENE-ESTER BASED ADDITION POLYMER AND METHOD FOR PREPARING THE SAME

BACKGROUND OF THE INVENTION (a) Field of the Invention

The present invention relates to a norbornene based addition polymer, and more particularly to an addition polymer of norbornene based monomers containing an ester group.

(b) Description of the Related Art

Currently, polymethylmethacrylate (PMMA), polycarbonate (PC), etc. are widely used as transparent polymers. Although PMMA has good transparency, it has poor dimensional stability due to its high hygroscopicity. Therefore, it is not suitable for materials for precision optical devices or displays.

Until recently, inorganic substances such as silicon oxide or silicon nitride have been predominantly used for insulation materials. However, with the increasing need for small-sized and highly efficient devices, new highly functional materials are required.

In this regard, polymers having low dielectric constants; low hygroscopicity; superior metal adhesivity, strength, thermal stability; and transparency; and high glass transition temperatures ($T_g$>250° C.) attract a lot of attention. Such polymers may be used for insulation films of semiconductors or TFT-LCDs; protection films for polarizers, multichip modules, integrated circuits (ICs), and printed circuit boards; and molding compounds for electronic devices or optical materials for flat panel displays. Currently, polyimide, BCB (bis-benzocyclobutene), etc. are used as low dielectric materials for electronic devices.

Polyimide has long been used for electronic devices due to its good thermal stability and oxidative stability, high glass transition temperature, and superior mechanical properties. However, it has problems of corrosion due to high hygroscopicity, an increase in dielectric constant, its anisotropic electric property, a need for pre-treatment to reduce reaction with copper wire, its metal adhesivity, and so forth.

Although BCB has lower hygroscopicity and a lower dielectric constants than polyimide, its metal adhesivity is not good, and curing at a high temperature is required to obtain desired physical properties. Physical properties of BCB are affected by curing time and temperature.

There has been much research on cyclic olefin copolymers using transition metal catalysts. Cyclic monomers can be polymerized by ROMP (ring opening metathesis polymerization), HROMP (ring opening metathesis polymerization followed by hydrogenation), copolymerization with ethylene, and homogeneous polymerization, as shown in the following Scheme 1:

[Scheme 1]

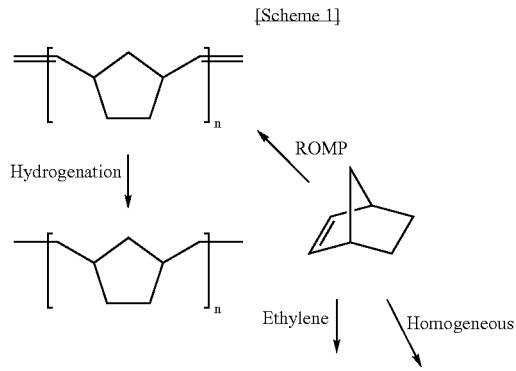

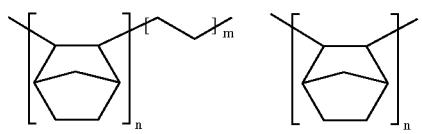

Polymers synthesized by ROMP have significantly poor thermal stability and oxidative stability due to unsaturation of the main chain, and are used as thermoplastic resins or thermosetting resins. Tenny et al. disclose, in U.S. Pat. No. 5,011,730, that a thermosetting resin prepared by the above method can be used for a circuit board, by reaction injection molding. However, as mentioned above, it has problems of thermal stability, oxidative stability, and low glass transition temperature.

There have been attempts to stabilize the main chain of the polymer by hydrogenation. Although a polymer prepared by this method has improved oxidative stability, the thermal stability is reduced. In general, hydrogenation increases the glass transition temperature of an ROMP polymer by about 50° C., but because of the ethylene groups located between the cyclic monomers, the glass transition temperature is still low (Metcon 99). Moreover, a cost increase due to increased polymerization steps and weak mechanical properties of the polymer are hindering its commercial use.

From addition copolymerization with ethylene, a product called Apel was obtained using a homogeneous vanadium catalyst. However, this method has problems of low catalytic activity and generation of excessive oligomers.

A zirconium based metallocene catalyst has been reported to give a polymer having a narrow molecular weight distribution and a large molecular weight (*Plastic News*, Feb. 27, 1995, p. 24). However, the activity of the catalyst decreases with an increase of cyclic monomer concentration, and the obtained copolymer has a low glass transition temperature ($T_g$<200° C.). In addition, although the thermal stability increases, the mechanical strength is still weak and its chemical resistance against solvents, such as halogenated hydrocarbon solvents, is poor.

Addition polymerization of norbornene using a palladium based transition metal catalyst was reported in 1967 by Union Carbide (US) [U.S. Pat. No. 3,330,815]. Although the copolymer prepared by this method has polar groups, it has a molecular weight (Mn) lower than 10,000. Later, Gaylord et al. reported polymerization of norbornene using a transition metal catalyst (Gaylord, N. G.; Deshpande, A. B.; Mandal, B. M.; Martan, M. *J. Macromol. Sci.-Chem.* 1977, A11(5), 1053-1070). [Pd($C_6H_5$CN)$Cl_2]_2$ was used as the catalyst, and the yield was 33%. Later still, a norbornene polymer was prepared using a [Pd($CH_3$CN)$_4$][$BF_4]_2$ catalyst, etc. (Sen, A.; Lai, T.-W. *J. Am. Chem. Soc.* 1981, 103, 4627-4629).

Kaminsky et al. reported homogeneous polymerization of norbornene using a zirconium based metallocene catalyst (Kaminsky, W.; Bark, A.; Drake, I. *Stud. Surf. Catal.* 1990, 56, 425). However, the polymer prepared by this method is very crystalline and is hardly soluble in organic solvents, and thermal decomposition occured without showing a glass transition temperature. Therefore, further studies could not be conducted.

Like the above-explained polyimide or BCB (bis-benzocyclobutene), the cyclic polymers also have poor metal adhesivity. For a polymer to be used for electronic devices, it should have good adhesivity to a variety of surfaces, such as silicon, silicon oxide, silicon nitride, alumina, copper, aluminum, gold, silver, platinum, titanium, nickel, tantalum, chromium, the polymer itself, or other polymers.

The following method was introduced to increase metal adhesivity of polyimide, BCB, etc. A substrate is treated with an organic silicon coupling agent having two functional groups, such as amino-propyltriethoxysilane or triethoxyvinylsilane, then the substrate is treated with a polymer or a polymer precursor. In this reaction, it is believed that the hydrolyzed silyl group and the hydroxy group on the substrate surface form a covalent bond.

A cyclic polymer can be used for insulating electronic devices, replacing inorganic materials such as silicon oxide or silicon nitride. For a functional polymer to be used for electronic devices, it should have a low dielectric constant; low hygroscopicity; superior metal adhesivity, strength, thermal stability, and transparency; and a high glass transition temperature ($T_g > 250°$ C.).

Such a polymer can be used for insulation films of semiconductor devices or TFT-LCDs. Here, amino groups on the substrate surface react with functional groups of the polymer or the polymer precursor to form bridges linking the substrate and the polymer. This technique has been disclosed in U.S. Pat. No. 4,831,172. However, this method is a multi-step process and requires a coupling agent.

Introduction of functional groups to a polymer comprising hydrocarbons is a useful method for the control of chemical and physical properties of the polymer. However, introduction of functional groups is not easy because unshared electron pairs of the functional groups tend to react with active catalytic sites. A polymer obtained by polymerizing cyclic monomers having functional groups has a low molecular weight (U.S. Pat. No. 3,330,815).

In order to overcome this problem, a method of adding the monomers having functional groups at a later step of polymerization has been reported (U.S. Pat. No. 5,179,171). However, the thermal stability of the polymer has not increased by this method. Additionally, physical and chemical properties and metal adhesivity did not improve significantly.

As an alternative, a method of reacting functional groups with a base polymer in the presence of a radical initiator has been introduced. However, this method involves problems in that the grafting site cannot be controlled, and only a small amount of radicals are grafted. The excessive radicals cut the polymers to decrease the molecular weight of the polymer, or they are not grafted to the base polymer but polymerize with other radicals.

When a polycyclic compound having a silyl group is used for an insulation film, it decomposes by moisture in the air. Furthermore, when the silyl group is reacted with metal, by-products such as water or ethanol are produced, which are not completely removed and increase the dielectric constant or cause corrosion of other metals.

In cyclic olefin monomers having polar groups such as an ester group, the functional groups increase intermolecular packing and improve adhesivity to metal substrates or other polymers, which allows them to be used for electronic devices. Therefore, polymerization or copolymerization of norbornene having an ester group has attracted continuous attention (McKeon et al., U.S. Pat. No. 3,330,815; Maezawa et al., Europe Patent No. 0445755A2; Risse et al., *Macromolecules*, 1996, Vol. 29, 2755-2763; Risse et al., *Makromol. Chem.* 1992, Vol. 193, 2915-2927; Sen et al., *Organometallics* 2001, Vol. 20, 2802-2812; Goodall et al., U.S. Pat. No. 5,705,503; Lipian et al., U.S. Pat. No. 6,455,650).

U.S. Pat. No. 3,330,815 discloses a polymer prepared from polymerization of norbornene based monomers having a polar group using a palladium based catalyst. However, the polymer obtained by this method has a molecular weight (Mn) lower than 10,000.

Europe Patent No. 0445755A2 discloses a copolymer of a norbornene derivative containing halogen, oxygen, or nitrogen, and a nickel and palladium based catalyst for preparing the same. However, examples of this patent do not present polymerization of a norbornene derivative having a polar group, and just present polymerization of norbornene itself.

Risse et al. reported that in polymerization of a norbornene derivative having a polar group such as an ester group using a palladium based catalyst, the presence of an endo form of ester-norbornene, which is a monomer, (endo/exo=80/20) reduces polymerization yield and molecular weight compared to when there is only an exo isomer (*Makromol. Chem.*, 1992, Vol. 193, 2915-2927; Risse et al.; *Macromolecules*, 1996, Vol. 29, 2755-2763; Risse et al.).

In the report of Risse et al., the polar group is not directly connected to the norbornene based monomer, but rather through a methyl group. However, according to the report of Sen et al., the polymerization yield and the molecular weight reduce even more if the polar group is directly connected to the norbornene ring (*Organometallics*, 2001, Vol. 20, 2802-2812). To be specific, when a polar group such as an ester group is directly connected to the norbornene ring, the polymerization yield was lower than 40%, and the molecular weight (Mn) was below 10,000.

The reason why the polymerization yield and the molecular weight are low is that the unshared electron oxygen pair of the endo isomer of the ester binds with the vacant metal site, which blocks approach of other norbornene monomers to the metal, and therefore prevents further polymerization, as explained by Sen et al. (*Organometallics*, 2001, Vol. 20, 2802-2812). As such, when a monomer having a polar group is used for polymerization, it is preferable to use an exo-only or exo-rich monomer. Otherwise, the endo isomer causes problems.

Later, Risse and Goodall et al. disclosed a polymer prepared from a monomer having a polar group, the majority of which is an endo isomer (U.S. Pat. No. 5,705,503). However, when only the polar norbornene derivative such as ester is homopolymerized, a large amount of catalyst (catalyst/monomer=1/100) should be used.

SUMMARY OF THE INVENTION

It is an object of the present invention to provide a norbornene-ester based addition polymer having a low dielectric constant, low hygroscopicity, a high glass transition temperature, superior thermal stability and oxidative stability, good chemical resistance and toughness, and superior metal adhesivity, and a method for preparing the same.

It is another object of the present invention to provide a norbornene-ester based addition polymer with good optical properties that can be used for a protection film of a polarizer, a retardation film, a glass substrate, etc., and a method for preparing the same.

It is still another object of the present invention to provide a norbornene-ester based addition polymer that can be used for electronic devices, such as integrated circuits, printed circuit boards, and multichip modules, and a method for preparing the same.

It is still another object of the present invention to provide a norbornene-ester based addition polymer that can be adhered to a substrate of an electronic device without using a coupling agent, and a method for preparing the same.

It is still another object of the present invention to provide a norbornene-ester based addition polymer that can be adhered well to a substrate made of copper, silver, or gold, and a method for preparing the same.

It is still another object of the present invention to provide a method for preparing an exo-rich norbornene-ester based monomer in a high yield.

It is still another object of the present invention to provide an optical film comprising a norbornene-ester based addition polymer.

In order to attain these objects, the present invention provides a norbornene-ester based addition polymer that comprises a norbornene-ester based monomer having a molecular weight (Mn) larger than 20,000, and comprising more than 50 mol % of exo norbornene-ester monomer, as a repeating unit.

The present invention also provides a method for preparing an exo-rich norbornene-ester based monomer comprising more than 50 mol % of exo norbornene-ester monomer, which comprises a step of carrying out a Diels-Alder reaction of dicyclopentadiene and an ester compound at 180 to 260° C. for a duration of time in which the reaction quotient defined by the following Equation 1 ranges from 82,000 to 155,000:

$$\text{Reaction quotient} = [\text{reaction temperature (° C.)}]^2 \times \log[\text{reaction time (min)}]. \quad \text{[Equation 1]}$$

The present invention also provides a method for preparing a norbornene-ester based addition polymer, which comprises:

a) a step of preparing a norbornene-ester based monomer comprising more than 50 mol % of exo norbornene-ester monomer; and b) a step of preparing a norbornene-ester based addition polymer having a molecular weight (Mn) larger than 20,000, and comprising more than 50 mol % of exo norbornene-ester monomer as a repeating unit, by polymerizing a monomer comprising the norbornene-ester based monomer of step a) in solution phase in the presence of a catalyst system, which comprises a Group X transition metal compound with an anionic ligand that offers σ- and π-bonds, as a catalyst.

The present invention also provides an optically anisotropic film which comprises a norbornene-ester based addition polymer comprising a norbornene-ester based monomer having a molecular weight (Mn) larger than 20,000, and comprising more than 50 mol % of exo norbornene-ester monomer as a repeating unit.

DETAILED DESCRIPTION OF THE PREFERRED EMBODIMENTS

Figure 1:
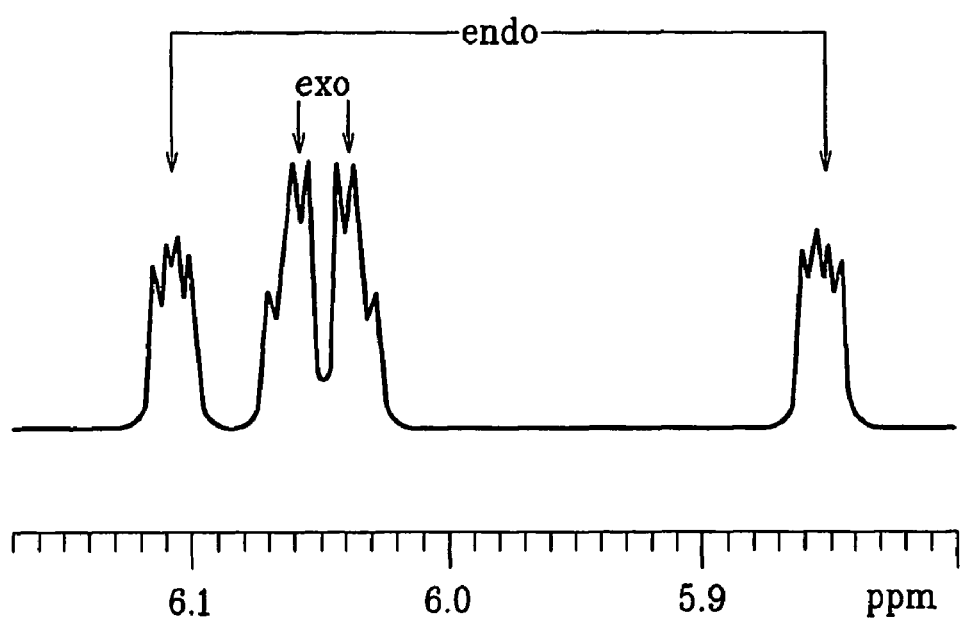
FIG. 1 is the ratio of exo and endo norbornene-ester isomers analyzed by NMR.

Hereinafter, the present invention is explained in more detail.

The present inventors realized that an exo-rich norbornene-ester based monomer comprising more than 50 mol % of exo norbornene-ester monomer can be obtained in high yield from a Diels-Alder reaction by controlling the reaction temperature and reaction time, and that a norbornene-ester based addition polymer with a large molecular weight can be obtained in high yield if the exo-rich norbornene-ester monomer is polymerized in the presence of a Group X transition metal catalyst with a specific ligand. Also, they realized that the obtained norbornene-ester based addition polymer has superior optical properties so as to be used for a protection film of a polarizer, a retardation film, or a glass substrate, and that it has good adhesivity to a variety of substrates.

The present invention provides an addition polymer of a norbornene based olefin having a polar group such as an ester group, which is polymerized from an exo-rich norbornene based monomer comprising more than 50 mol % of exo isomer, and a method for preparing the same.

The norbornene-ester based monomer used for preparing norbornene-ester based addition polymer in the present invention is prepared by a Diels-Alder reaction of norbornene compound and ester compound. Since the Diels-Alder reaction is highly stereoselective, endo isomers are produced more easily than exo isomers. A transition metal catalyst, which is usually used for polymerization of olefin, has better polymerization activity for exo isomers than for endo isomers. Accordingly, a monomer mixture comprising more than 50 mol % of endo isomer cannot offer a good polymerization activity.

The present invention prepares a norbornene based monomer mixture having a polar group, such as norbornene-ester, which comprises more than 50 mol % of exo norbornene-ester monomer by controlling temperature and time of the Diels-Alder reaction.

From a comparison of reaction energies of the endo isomer and the exo isomer having an ester group, the following can be found.

In preparation of norbornene carboxylic acid methyl ester from Diels-Alder reaction of dicyclopentadiene (DCPD) and methyl acrylate, the energies of the reactants, transition state, and the products are shown in the following Scheme 2:

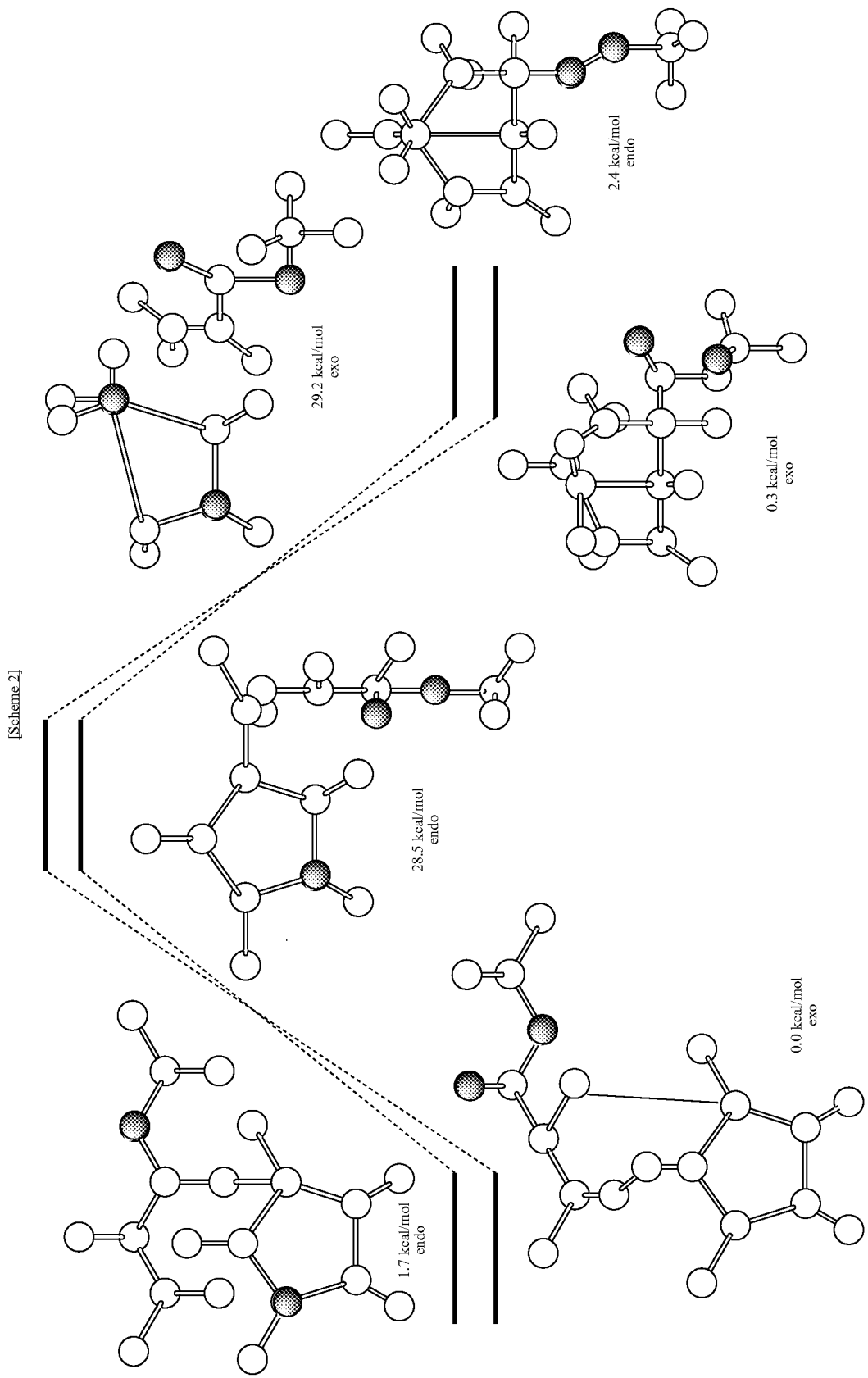

The transition state energy is lower for the endo isomer than the exo isomer by about 0.7 kcal/mol. However, the energy of the products is lower for the exo isomer than that of the endo isomer by about 2 kcal/mol. This can also be identified from the DFT (density functional theory) calculation.

Since the endo isomer is more stable at the transition state (kinetically), the endo isomer is easily generated from the Diels-Alder reaction. However, since the exo isomer is more stable as product (thermodynamically), an exo-rich monomer mixture can be obtained by controlling the reaction time and the reaction temperature.

Actually, when methyl ester-norbornene was prepared by Diels-Alder reaction at 180° C., as in Comparative Example 1 and Example 1, the exo/endo isomer ratio was 41/59 when the reaction time was 5 hours, and 52/48 when the reaction time was increased to 6 hours.

If the reaction temperature is increased, the thermodynamically preferable exo isomer becomes dominant. Actually, when the Diels-Alder reaction was carried out at 220° C. for 2 hours, as in Example 4, the exo/endo was 55.8/44.2, which offered more thermodynamically stable exo isomers than at 200° C.

When the reaction time of the Diels-Alder reaction at 200° C. was increased from 2 hours to 5 hours, the exo isomer increased and the exo/endo ratio became 54.5/45.5 (Comparative Example 2 and Example 3). The increase of exo isomer content due to increase of the reaction time was also observed at 220° C. and 260° C.

The exo/endo ratio of the obtained monomer mixture can be identified by nuclear magnetic resonance (NMR) spectroscopy. From various kinds of NMR experiments and computer modeling calculations, the difference in chemical shift of olefinic protons of the two isomers is found, and from a relative integration of these signals, the exo/endo ratio can be easily determined.

The reaction condition for obtaining a norbornene-ester based monomer mixture comprising more than 50 mol % of exo norbornene-ester monomer from the Diels-Alder reaction of norbornene compound and ester compound is: reaction temperature=180 to 260° C.; reaction time=the time satisfying the reaction quotient of Equation 1.

If the reaction temperature is below 180° C., an endo-rich norbornene-ester based monomer is obtained even when the reaction time is increased. Otherwise, if it exceeds 260° C., an unwanted monomer with a large molecular weight generated by continued Diels-Alder reaction even when the reaction time is decreased, and therefore the monomer yield decreases.

Even when the reaction temperature is in the range of 180 to 260° C., if the reaction time does not satisfy the reaction quotient of 82,000 to 155,000, the exo-rich norbornene-ester based monomer is not obtained, or the yield of the exo-rich norbornene-ester based monomer decreases.

For example, an endo-rich norbornene-ester based monomer was obtained in the following conditions: reaction temperature=180° C., reaction time=5 hours (reaction quotient=80,259) [Comparative Example 1]; reaction temperature=200° C., reaction time=1 hour (reaction quotient=71,126) [Comparative Example 2]; and reaction temperature=260° C., reaction time=0.2 hour (reaction quotient=72,953). When the reaction temperature was 260° C., and the reaction time was 4 hours (reaction quotient=160, 902) [Comparative Example 4], the yield of the exo-rich norbornene-ester based monomer decreased due to a side reaction, similar to when the reaction temperature was increased.

In preparing a norbornene-ester based monomer mixture comprising more than 50 mol % of exo norbornene-ester monomer by the Diels-Alder reaction of norbornene compound and ester compound, the present invention may use a polymerization inhibitor to prevent polymerization of the reactant or product. A typical example of the polymerization inhibitor is hydroquinone. Preferably, the content of polymerization inhibitor ranges from 0.005 to 3 parts by weight for 100 parts by weight of dicyclopentadiene and ester compound.

The obtained norbornene-ester based monomer mixture can be represented by the following Chemical Formula 1:

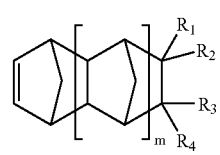

[Chemical Formula 1]

wherein m is an integer of 0 to 4;

at least one of $R_1$, $R_2$, $R_3$, and $R_4$ is a radical having an ester group; and each of the other $R_1$, $R_2$, $R_3$, and $R_4$ is hydrogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; or halogen.

If $R_1$, $R_2$, $R_3$, and $R_4$ are not radicals having an ester group, hydrogen, or halogen, $R_1$ and $R_2$, or $R_3$ and $R_4$ may be connected to form a $C_1$ to $C_{10}$ alkylidene group, or $R_1$ or $R_2$ may be connected with one of $R_3$ and $R_4$ to form a $C_4$ to $C_{12}$ saturated or unsaturated cyclic group or a $C_6$ to $C_{17}$ aromatic group.

The present invention prepares a norbornene-ester based addition polymer having a molecular weight (Mn) larger than 20,000 and comprising more than 50 mol % of exo norbornene-ester monomer by solution-phase polymerization of a norbornene-ester based monomer mixture comprising more than 50 mol % of exo norbornene-ester monomer as a repeating unit in the presence of a catalyst system comprising a Group X transition metal compound. Since an exo-rich (the content of the exo isomer is larger than 50 mol %) norbornene-ester based monomer, which could not be prepared by the conventional method, is used for polymerization, the polymerization activity is superior, a very small amount of catalyst is used, and the prepared polymer has a large molecular weight.

The norbornene-ester based addition polymer of the present invention may have a variety of forms by selecting monomers. A norbornene-ester based monomer comprising more than 50 mol % of exo norbornene-ester monomer is used as the basic polymerization monomer. Even when other monomers (a norbornene monomer having at least one ester group, a norbornene based monomer not having an ester group, etc.) are added together, an addition polymer having a large molecular weight can be prepared at superior polymerization activity with a very small amount of catalyst. The forms of the polymer are as follows. Other than these, a variety of monomers may be added to prepare copolymers.

The first is an addition homopolymer of a norbornene-ester monomer prepared from the norbornene-ester monomer only.

The second is an addition copolymer prepared from two or more different norbornene-ester monomers.

The third is an addition copolymer of a norbornene-ester monomer and a norbornene based monomer not having an ester group which is prepared from a norbornene-ester monomer and a norbornene based monomer not having an ester group.

Preferably, the norbornene based monomer not having an ester group of the third form is represented by the following Chemical Formula 2:

[Chemical Formula 2]

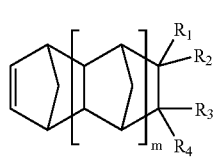

wherein m is an integer of 0 to 4; and each of $R_1$, $R_2$, $R_3$, and $R_4$ is selected from a group consisting of: hydrogen; halogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; $C_1$ to $C_{20}$ linear or branched haloalkyl, haloalkenyl, or halovinyl; $C_5$ to $C_{12}$ halocycloalkyl substituted by hydrocarbon or unsubstituted; $C_6$ to $C_{40}$ haloaryl substituted by hydrocarbon or unsubstituted; $C_7$ to $C_{15}$ haloaralkyl substituted by hydrocarbon or unsubstituted; $C_3$ to $C_{20}$ haloalkynyl; and a non-hydrocarbonaceous polar group having at least one oxygen, nitrogen, phosphorus, sulfur, silicon, or boron atom, independently or simultaneously.

If $R_1$, $R_2$, $R_3$, and $R_4$ are not hydrogen, halogen, or a polar group, $R_1$ and $R_2$, or $R_3$ and $R_4$ may be connected to form a $C_1$ to $C_{10}$ alkylidene group, or $R_1$ or $R_2$ may be connected with one of $R_3$ and $R_4$ to form a $C_4$ to $C_{12}$ saturated or unsaturated cyclic group or a $C_6$ to $C_{24}$ aromatic group.

The non-hydrocarbonaceous polar group of Chemical Formula 2 may be selected from the following functional groups:

—$OR_6$, —$OC(O)OR_6$, —$R_5OC(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$NCO$, $R_5$—$NCO$, —$CN$, —$R_5CN$, —$NNC(=S)R_6$, —$R_5NNC(=S)R_6$,

—$NO_2$, —$R_5NO_2$,

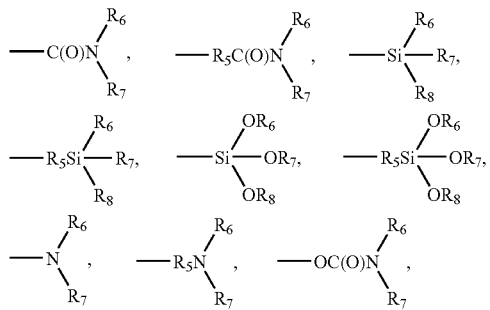

-continued

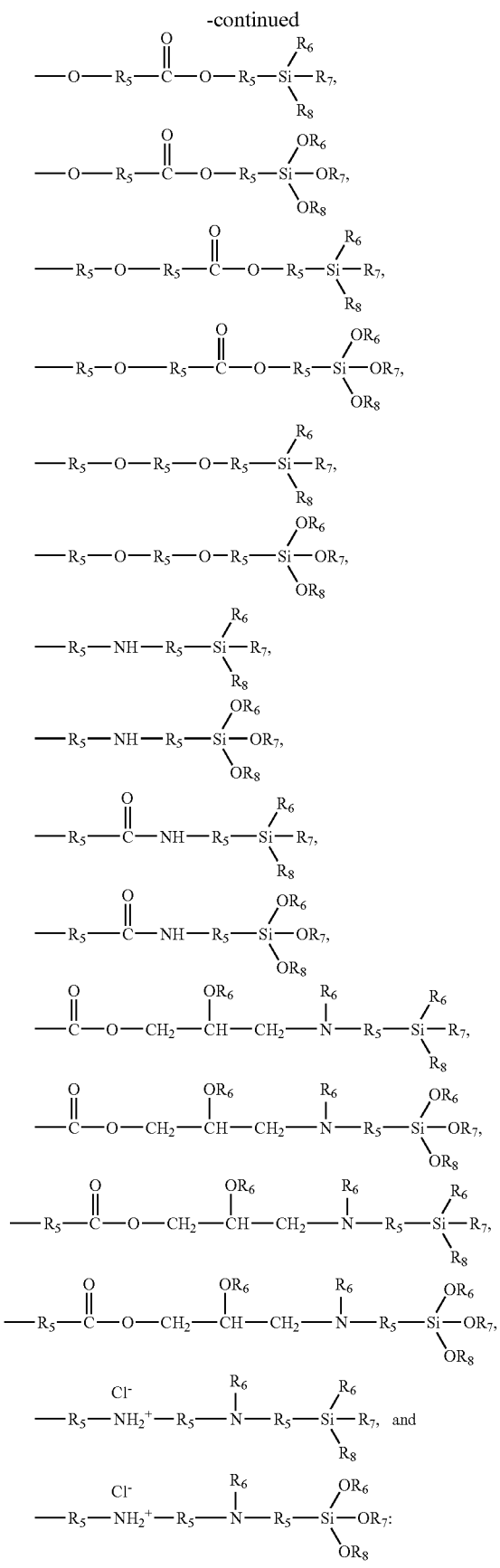

wherein $R_5$ is $C_1$ to $C_{20}$ linear or branched alkyl, haloalkyl, alkenyl, haloalkenyl, vinyl, halovinyl; $C_4$ to $C_{12}$ cycloalkyl or halocycloalkyl substituted by hydrocarbon or unsubstituted; $C_6$ to $C_{40}$ aryl or haloaryl substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl;

each of $R_6$, $R_7$, and $R_8$ is hydrogen, halogen, $C_1$ to $C_{20}$ linear or branched alkyl, haloalkyl, alkenyl, haloalkenyl, vinyl, halovinyl, alkoxy, haloalkoxy, carbonyloxy, halocarbonyloxy; $C_4$ to $C_{12}$ cycloalkyl or halocycloalkyl substituted by hydrocarbon or unsubstituted; $C_6$ to $C_{40}$ aryl, haloaryl, aryloxy, or haloaryloxy substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl; and p is an integer of 1 to 10.

The addition polymer of the present invention comprises a norbornene-ester based monomer comprising more than 50 mol % of exo norbornene-ester monomer as a repeating unit in 0.1 to 100 mol %. Even in copolymerization with a norbornene based monomer not having an ester group, a small amount of the norbornene-ester based monomer comprising more than 50 mol % of exo norbornene-ester monomer offers a good polymerization activity.

The norbornene based monomer having an ester group (norbornene-ester based monomer) is more advantageous in terms of polymerization activity and molecular weight than a monomer having more than one ester group. However, with regard to other physical properties such as metal adhesivity, a copolymer prepared from a monomer having more than one ester group shows superior polymerization characteristics than monomer having one ester group.

In the present invention, the norbornene-ester based addition polymer is polymerized in solution phase in the presence of a catalyst system comprising a Group X metal compound with an anionic ligand offering σ- and π-bonds. Unless the polymerization is carried out in the presence of a catalyst system comprising a Group X metal compound with an anionic ligand offering σ- and π-bonds, the polymerization activity is low, and it is difficult to obtain a polymer having a large molecular weight. And; since a norbornene-ester based monomer comprising more than 50 mol % of exo norbornene-ester monomer (exo-rich monomer) is used, there is no decrease of polymerization activity as for an endo-rich norbornene-ester based monomer.

Preferably, the Group X transition metal compound with an anionic ligand offering σ- and π-bonds is a compound represented by the following Chemical Formula 3 or Chemical Formula 4:

$M(R)_2$  [Chemical Formula 3]

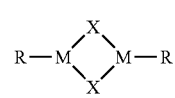 [Chemical Formula 4]

wherein

M is a Group X metal;

X is halogen; and

R is an anionic ligand offering σ- and π-bonds such as hydrocarbyl, acetylacetonate (R'C(O)CHC(O)R'), or acetate; wherein each of R' is hydrogen, $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_6$ to $C_{40}$ aryl having a hetero atom; $C_7$ to $C_{15}$ aralkyl substituted by hydrocarbon or unsubstituted; or $C_3$ to $C_{20}$ alkynyl.

The present invention involves mixing of a monomer, a catalyst, and, if necessary, a cocatalyst in a solvent followed by polymerization, as in the conventional polymerization method.

For the cocatalyst, any compound that can activate the Group X transition metal can be used. Preferably, a compound capable of offering $H^+$, a compound comprising a Group XV electron-donating ligand, or a salt capable of offering an anion that can be weakly coordinated to the transition metal is used to activate the Group X transition metal compound with an anionic ligand offering σ- and π-bonds.

The polymerization of the present invention is carried out in the temperature range of −100° C. to 200° C., preferably −60° C. to 120° C., and more preferably −10° C. to 100° C. The polymerization temperature depends on the monomer used. In addition, if the temperature is below −100° C., the polymerization activity becomes very low, and if it exceeds 200° C., it is difficult to obtain a polymer having a large molecular weight due to decomposition of catalyst, and so forth. For the polymerization solvent, it is preferable to use one whose boiling point is higher than the polymerization temperature.

The catalyst system of the present invention comprises a much smaller amount of catalyst than the conventional catalyst systems. The amount of catalyst used is 1/2,500 to 1/100,000 for the total moles of the monomer used. As such, a desired polymerization can be attained using a small amount of catalyst.

The molecular weight (Mn) of a norbornene-ester based addition polymer prepared by the present invention is over 20,000. Under usual polymerization conditions, a molecular weight (Mn) of 20,000 to 1,000,000 is obtained.

The conventional polycyclic compound having a silyl group generates byproducts, such as water and ethanol, when attached to a metal. These byproducts are not completely removed and may reduce the dielectric constant or corrode other metals. However, for the norbornene-ester based addition polymer of the present invention, the ester group adheres to metal strongly and directly, and thus no byproduct is generated. Therefore, there is no concern about reduction of dielectric constant or corrosion of metals.

Accordingly, the norbornene-ester based addition polymer of the present invention is transparent, has good adhesivity to metal or polymer having other polar groups, a low dielectric constant, low hygroscopicity, a high glass transition temperature, superior thermal stability and oxidative stability, superior chemical resistance and toughness, and good metal adhesivity. And, since it is a cyclic olefin addition polymer having superior optical characteristics, capable of being attached to a substrate (made of copper, silver, gold, etc.) of an electronic device without a coupling agent, it can be used for a transparent polymer such as an optical film, a plastic substrate material, POF (plastic optical fiber), a low dielectric coating agent or film such as integrated circuits and multichip modules, or insulating electronic materials such as a PCB (printed circuit board).

The norbornene-ester based addition polymer of the present invention has optical characteristics not known conventionally. A film made of a norbornene-ester based addition polymer, which comprises a norbornene-ester based monomer having a molecular weight (Mn) larger than 20,000 and comprising more than 50 mol % of exo norbornene-ester monomer as a repeating unit, has a unique birefringence.

Because the general conformational unit of cyclic olefin has one or two stable rotational states, an extended conformation can be formed, as in polyimide whose main chain is rigid phenyl rings. The present inventors found that when a polar group such as an ester is introduced to a norbornene based polymer having such an extended conformation, the intermolecular interaction increases, and the intermolecular packing has a directional order, and therefore the polymer can have optical and electrical anisotropy.

Accordingly, with the norbornene-ester based addition polymer having a large molecular weight prepared by the present invention, an optically anisotropic film having a controllable birefringence can be prepared. The birefringence can be controlled by the kind and content of the ester polar group introduced to the addition polymer. Especially, because control of the birefringence property in the film thickness direction is easy, it can be used for an optical film, an optically anisotropic film, an optical compensation film (retardation film) for LCDs (liquid crystal displays) of a variety of modes, a protection film of a polarizer, and so forth.

The optically anisotropic film or sheet is prepared by dissolving the norbornene-ester based addition polymer of the present invention in a solvent by the casting method. Or, the film can be prepared from a blend comprising more than one norbornene-ester based addition polymers.

Such prepared optically anisotropic film has a retardation value ($R_{th}$), defined by the following Equation 2, of 70 to 1000 nm:

$$R_{th} = \Delta(n_y - n_z) \times d \qquad \text{[Equation 2]}$$

wherein $n_y$ is the refractive index in the fast axis direction in a plane measured at a wavelength of 550 nm;

$n_z$ is the refractive index in the thickness direction measured at a wavelength of 550 nm; and d is the film thickness.

Since the refractive indices of such an optically anisotropic film satisfy the relationship of $n_x \approx n_y > n_z$ ($n_x$=the refractive index in the slow axis direction in a plane; $n_y$=the refractive index in the fast axis direction in a plane; $n_z$=the refractive index in the thickness direction), the film can be used for a negative C-plate type optical compensation film for LCDs of a variety of modes.

Also, since the film has no hygroscopicity, has good adhesivity to the conventional polyvinyl alcohol polarization film, has superior chemical resistance, and is transparent, it can be used for a protection film of a polarizer.

Hereinafter, the present invention is described in more detail through Examples and Comparative Examples. However, the following Examples are only for the understanding of the present invention, and the present invention is not limited by the following Examples.

EXAMPLES

All procedures treating compounds sensitive to air or water were carried out by the standard Schlenk technique or using a dry box. The nuclear magnetic resonance (NMR) spectra were obtained using a Bruker 600 spectrometer and a Bruker 300 spectrometer. $^1$H NMR was measured at 600 MHz or 300 MHz, and $^{13}$C NMR was measured at 150 MHz and 75 MHz. For a definite analysis of NMR signals, 2-dimensional experiments, such as COSY and HMBC, were carried out. Molecular weight and molecular weight distribution of polymers were determined by GPC (gel permeation chromatography) using a polystyrene sample as a standard. Thermal analysis, such as TGA and DSC, was carried out using a TA instrument (TGA 2050; heating rate=10K/min).

Toluene was purified by distillation in potassium/benzophenone, and $CH_2Cl_2$ was purified by distillation in $CaH_2$.

Comparative Example 1

Preparation of Endo-rich Norbornene Carboxylic Acid Methyl Ester (180° C., 5 Hours, Reaction Quotient=80,259)

DCPD (dicyclopentadiene; Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 180° C., reaction was carried out for 5 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 85%). The molar ratio (mol %) of exo/endo isomers of the product was 41.1:58.9.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, $CDCl_3$), endo: δ 29.10 ($CH_2$), 42.39 (CH), 43.03 (CH), 45.52 (CH), 49.47 ($CH_2$), 51.28 ($CH_3$), 132.23 (CH), 137.56 (CH), 175.02 (C); exo: δ 30.20 ($CH_2$), 41.49 (CH), 42.83 (CH), 46.21 ($CH_2$), 46.43 (CH), 51.53 ($CH_3$), 135.59 (CH), 139.90 (CH), 176.52 (C).

Example 1

Preparation of Exo-rich Norbornene Carboxylic Acid Methyl Ester (180° C. 6 Hours, Reaction Quotient=84,993)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 180° C., reaction was carried out for 6 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 86%). The molar ratio (mol %) of exo/endo isomers of the product was 52:48.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, $CDCl_3$), endo: δ 29.10 ($CH_2$), 42.39 (CH), 43.03 (CH), 45.52 (CH), 49.47 ($CH_2$), 51.28 ($CH_3$), 132.23 (CH), 137.56 (CH), 175.02 (C); exo: δ 30.20 ($CH_2$), 41.49 (CH), 42.83 (CH), 46.21 ($CH_2$), 46.43 (CH), 51.53 ($CH_3$), 135.59 (CH), 139.90 (CH), 176.52 (C).

Example 2

Preparation of Exo-rich Norbornene Carboxylic Acid Butyl Ester (190° C. 5 Hours, Reaction Quotient=89,424)

DCPD (Aldrich, 180 mL, 1.34 mol), butyl acrylate (Junsei, 500 mL, 3.49 mol), and hydroquinone (2.7 g, 0.025 mol) were put in a 2 L autoclave. After heating to 190° C., reaction was carried out for 5 hours while stirring the autoclave at 300 rpm. After the reaction was completed, the reaction mixture was cooled down and transferred to a distillation unit. The reaction mixture was distilled at 1 torr using a vacuum pump at 80° C. to obtain the product (yield: 78%). The molar ratio (mol %) of exo/endo isomers of the product was 56.2:43.8.

$^1$H-NMR (600 MHz, $CDCl_3$), endo: δ 6.17 (dd, 1H), 5.86 (dd, 1H), 3.97 (t, 2H), 3.15 (b, 1H), 2.88 (m, 1H), 2.85 (b, 1H), 1.86 (m, 1H), 1.57 (m, 2H), 1.35 (m, 4H), 1.21 (m, 1H), 0.89 (t, 3H); exo: δ 6.09 (m, 2H), 4.05 (t, 2H), 2.98 (b, 1H), 2.86 (b, 1H), 2.20 (m, 1H), 1.88 (m, 1H), 1.58 (m, 2H), 1.50 (d, 1H), 1.34 (m, 4H), 0.89 (t, 3H).

$^{13}$C-NMR (600 MHz, $CDC_3$), endo: δ 13.57 ($CH_3$), 19.04 ($CH_2$), 29.00 ($CH_2$), 30.63 ($CH_2$), 42.39 (CH), 43.20 (CH), 45.56 (CH), 49.45 ($CH_2$), 63.83 ($CH_2$), 132.21 (CH), 137.50 (CH), 174.05 (C); exo: δ 13.57 ($CH_3$), 19.04 ($CH_2$), 30.14 ($CH_2$), 30.63 ($CH_2$), 41.48 (CH), 43.04 (CH), 46.19 ($CH_2$), 46.48 (CH), 64.07 ($CH_2$), 135.61 (CH), 137.84 (CH), 176.05 (C).

Comparative Example 2

Preparation of Endo-rich Norbornene Carboxylic Acid Methyl Ester (200° C. 1 Hour, Reaction Quotient=71,126)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 200° C., reaction was carried out for 1 hour while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 81.2%). The molar ratio (mol %) of exo/endo isomers of the product was 47.7:52.3.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, $CDCl_3$), endo: δ 29.10 ($CH_2$), 42.39 (CH), 43.03 (CH), 45.52 (CH), 49.47 ($CH_2$), 51.28 ($CH_3$), 132.23 (CH), 137.56 (CH), 175.02 (C); exo: δ 30.20 ($CH_2$), 41.49 (CH), 42.83 (CH), 46.21 ($CH_2$), 46.43 (CH), 51.53 ($CH_3$), 135.59 (CH), 139.90 (CH), 176.52 (C).

Example 3

Preparation of Exo-rich Norbornene Carboxylic Acid Methyl Ester (200° C. 5 Hours, Reaction Quotient=99,085)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 200° C., reaction was carried out for 5 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 88.1%). The molar ratio (mol %) of exo/endo isomers of the product was 54.5:45.5.

$^1$H-NMR (600 MHz, $CDCl_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH₂), 46.43 (CH), 51.53 (CH₃), 135.59 (CH), 139.90 (CH), 176.52 (C).

Example 4

Preparation of Exo-rich Norbornene Carboxylic Acid Methyl Ester (220° C. 2 Hours, Reaction Quotient=100,632)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 220° C., reaction was carried out for 2 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 74.8%). The molar ratio (mol %) of exo/endo isomers of the product was 55.8:44.2.

¹H-NMR (600 MHz, CDCl₃), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH₂), 46.43 (CH), 51.53 (CH₃),135.59 (CH), 139.90 (CH), 176.52 (C).

Example 5

Preparation of Exo-rich Norbornene Carboxylic Acid Methyl Ester (220° C., 5 Hours, Reaction Quotient=119,893)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 220° C., reaction was carried out for 5 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 57.6%). The molar ratio (mol %) of exo/endo isomers of the product was 58.6:41.4.

¹H-NMR (600 MHz, CDCl₃), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH₂), 46.43 (CH), 51.53 (CH₃), 135.59 (CH), 139.90 (CH), 176.52 (C).

Example 6

Preparation of Exo-rich Norbornene Carboxylic Acid Methyl Ester (240° C. 2 Hours, Reaction Quotient=119,761)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 240° C., reaction was carried out for 2 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 52.4%). The molar ratio (mol %) of exo/endo isomers of the product was 55.9:44.1.

¹H-NMR (600 MHz, CDCl₃), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH₂), 46.43 (CH), 51.53 (CH₃), 135.59 (CH), 139.90 (CH), 176.52 (C).

Example 7

Preparation of Exo-rich Norbornene Carboxylic Acid Methyl Ester (240° C. 5 Hours, Reaction Quotient=142,682)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 240° C., reaction was carried out for 5 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 44.8%). The molar ratio (mol %) of exo/endo isomers of the product was 56.5:43.5.

¹H-NMR (600 MHz, CDCl₃), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH₂), 46.43 (CH), 51.53 (CH₃), 135.59 (CH), 139.90 (CH), 176.52 (C).

Comparative Example 3

Preparation of Exo-rich Norbornene Carboxylic Acid Methyl Ester (240° C., 10 Hours, Reaction Quotient=160,022)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 240° C., reaction was carried out for 10 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 9.3%). The molar ratio (mol %) of exo/endo isomers of the product was 56.1:33.9.

¹H-NMR (600 MHz, CDCl₃), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

¹³C-NMR (600 MHz, CDCl₃), endo: δ 29.10 (CH₂), 42.39 (CH), 43.03 (CH), 45.52 (CH), 49.47 (CH₂), 51.28 (CH₃), 132.23 (CH), 137.56 (CH), 175.02 (C); exo: δ 30.20 (CH₂), 41.49 (CH), 42.83 (CH), 46.21 (CH$_2$), 46.43 (CH), 51.53 (CH$_3$),135.59 (CH), 139.90 (CH), 176.52 (C).

Comparative Example 4

Preparation of Exo-rich Norbornene Carboxylic Acid Methyl Ester (260° C., 4 Hours, Reaction Quotient=160,902)

DCPD (Aldrich, 256.5 mL, 1.9 mol), methyl acrylate (Aldrich, 405 mL, 4.5 mol), and hydroquinone (3.2 g, 0.03 mol) were put in a 2 L autoclave. After heating to 260° C., reaction was carried out for 4 hours while stirring the autoclave at 300 rpm. After the reaction was completed, the reaction mixture was cooled down and transferred to a distillation unit. The reaction mixture was distilled at 1 torr using a vacuum pump at 50° C. to obtain the product (yield: 10.3%). The molar ratio (mol %) of exo/endo isomers of the product was 57.1:42.9.

$^1$H-NMR (600 MHz, CDCl$_3$), endo: δ 6.17 (dd, 1H), 5.91 (dd, 1H), 3.60 (s, 3H), 3.17 (b, 1H), 2.91 (m, 1H), 2.88 (b, 1H), 1.90 (m, 1H), 1.42 (m, 2H), 1.28 (m, 1H); exo: δ 6.09 (m, 2H), 3.67 (s, 3H), 3.01 (b, 1H), 2.88 (b, 1H), 2.20 (m, 1H), 1.88 (m, 1H), 1.51 (d, 1H), 1.34 (m, 2H).

$^{13}$C-NMR (600 MHz, CDCl$_3$), endo: δ 29.10 (CH$_2$), 42.39 (CH), 43.03 (CH), 45.52 (CH), 49.47 (CH$_2$), 51.28 (CH$_3$), 132.23 (CH), 137.56 (CH), 175.02 (C); exo: δ 30.20 (CH$_2$), 41.49 (CH), 42.83 (CH), 46.21 (CH$_2$), 46.43 (CH), 51.53 (CH$_3$), 135.59 (CH), 139.90 (CH), 176.52 (C).

Example 8

Preparation of Tetracyclododecene Methyl Ester (180° C. 17 Hours, Reaction Quotient=97,479, Cp Used)

Cyclopentadiene (Cp; DCPD was cracked at 180° C., 133 mL, 1.6 mol), methyl acrylate (Aldrich, 66 mL, 0.73 mol), and hydroquinone (0.17 g, 0.0015 mol) were put in a 300 mL autoclave, and a pressure of 2 bar was applied. After heating to 180° C., reaction was carried out for 17 hours while stirring the autoclave at 300 rpm. After the reaction was completed, the remaining methyl acrylate was removed using a vacuum pump. The product was separated from the residue by column chromatography using an eluent comprising hexane/ethyl acetate=40/1 (yield: 31%). The molar ratio (mol %) of exo/endo isomers of the product was 55:45.

$^1$H-NMR (300 MHz, CDCl$_3$): δ 5.98~5.91 (m, 2H), 3.69 & 3.63 (s, 3H, exo & endo), 2.86~2.77 (m, 2H), 2.58~2.36 (m, 2H), 2.25 (m, 1H), 2.09~1.99 (m, 2H), 2.17 (m, 1H), 1.79~1.60 (m, 2H), 1.32~1.16 (m, 2H), 0.79~0.70 (m, 1H).

Example 9

Preparation of Benzyl Ester Norbornene (200° C., 5 Hours, Reaction Quotient=99,085)

DCPD (Aldrich, 67.32 mL, 0.5 mol), benzyl acrylate (Lancaster, 163 g, 1.0 mol), and hydroquinone (0.23 g, 2.1 mmol) were put in a 2 L autoclave. After heating to 200° C., reaction was carried out for 5 hours while stirring the autoclave at 300 rpm. After the reaction was completed, the reaction mixture was cooled down and transferred to a distillation unit. The reaction mixture was distilled at 1 torr twice using a vacuum pump at 190° C. to obtain the product (yield: 65%). The molar ratio (mol %) of exo/endo isomers of the product was 56:44.

$^1$H-NMR (300 MHz, CDCl$_3$): δ 7.32 (m, 5H), 6.15~6.07 (m, 2H), 5.11~5.04 (m, 2H), 3.02~2.88 (m, 2H), 2.96 & 2.20 (m, 1H), 1.92 (m, 2H), 1.52~1.22 (m, 1H), 1.38 (m, 1H).

Preparation Example 1

Preparation of Phenyl Norbornene

DCPD (Aldrich, 55 mL, 0.41 mol), styrene (Aldrich, 146 mL, 1.27 mol), and 4-t-butylcartechol (1.9 g, 11.4 mmol) were put in a 2 L autoclave. After heating to 180° C., reaction was carried out for 4 hours while stirring the autoclave at 300 rpm. After the reaction was completed, the reaction mixture was cooled down. The reaction mixture was diluted with toluene and precipitated in ethanol. After the obtained polystyrene was filtered, the solvent was removed, and the filtrate was transferred to a distillation unit. The filtrate was distilled at 1 torr twice using a vacuum pump at 70° C. to obtain the product (yield: 43%).

$^1$H-NMR (300 MHz, CDCl$_3$): 87.32~7.15 (m, 5H), 6.29~5.81 (m, 2H), 3.43 & 2.75 (m, 1H), 3.11~2.94 (m, 2H), 2.22 (m, 1H), 1.54~1.48 (m, 2H), 1.33 (m, 1H).

Preparation Example 2

Preparation of Allylacetate Norbornene

DCPD (Aldrich, 248 mL, 1.852 mol), allylacetate (Aldrich, 500 mL, 4.63 mol), and hydroquinone (0.7 g, 0.006 mol) were put in a 2 L autoclave. After heating to 190° C., reaction was carried out for 5 hours while stirring the autoclave at 300 rpm. After the reaction was completed, the reaction mixture was cooled down and transferred to a distillation unit. The reaction mixture was distilled at 1 torr twice using a vacuum pump at 56° C. to obtain the product (yield: 30%). The molar ratio (mol %) of exo/endo isomers of the product was 57:43.

$^1$H-NMR (300 MHz, CDCl$_3$): δ 6.17~5.91 (m, 2H), 4.15~3.63 (m, 2H), 2.91~2.88 (m, 2H), 2.38 (m, 1H), 2.05 (s, 3H), 1.83 (m, 1H), 1.60~1.25 (m, 2H), 0.57 (m, 1H).

Example 10

Preparation of Norbornene Carboxylic Acid Methyl Ester/norbornene Addition Copolymer Using Pd(acac)$_2$ 8.37 g (54.98 mmol) of the norbornene carboxylic acid methyl ester prepared in Example 1, 12.08 g (128.3 mmol) of norbornene, and 39 mL of purified toluene solvent were put in a 250 mL Schlenk flask. Then, 5.6 mg of palladium(II) acetylacetonate [Pd(acac)$_2$] catalyst dissolved in 5 mL of toluene, 5.1 mg of tricyclohexylphosphine cocatalyst, and 29.4 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.84 g of norbornene carboxylic acid methyl ester/norbornene copolymer (yield: 77.5 mol % of used monomer). The number-average molecular weight (Mn) of the polymer was 106,000, and the weight-average molecular weight (Mw) was 251,000.

Example 11

Preparation of Norbornene Carboxylic Acid Methyl Ester/norbornene Addition Copolymer Using Pd(acac)$_2$

12.55 g (82.47 mmol) of the norbornene carboxylic acid methyl ester prepared in Example 1, 7.77 g (82.47 mmol) of norbornene, and 37 mL of purified toluene solvent were put in a 250 mL Schlenk flask. Then, 5.02 mg of Pd(acac)$_2$ catalyst dissolved in 5 mL of toluene, 4.63 mg of tricyclohexylphosphine cocatalyst, and 26.4 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.28 g of norbornene carboxylic acid methyl ester/norbornene copolymer (yield: 75.2 mol % of used monomer). The number-average molecular weight (Mn) of the polymer was 101,000, and the weight-average molecular weight (Mw) was 225,000.

Example 12

Preparation of Norbornene Carboxylic Acid Methyl Ester/norbornene Addition Copolymer Using Pd(acac)$_2$

16.74 g (110.0 mmol) of the norbornene carboxylic acid methyl ester prepared in Example 1, 4.44 g (47.13 mmol) of norbornene, and 37 mL of purified toluene solvent were put in a 250 mL Schlenk flask. Then, 4.79 mg of Pd(acac)$_2$ catalyst dissolved in 5 mL of toluene, 4.41 mg of tricyclohexylphosphine cocatalyst, and 25.2 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 12.96 g of norbornene carboxylic acid methyl ester/norbornene copolymer (yield: 61.2 mol % of used monomer). The number-average molecular weight (Mn) of the polymer was 81,000, and the weight-average molecular weight (Mw) was 164,000.

Example 13

Preparation of Norbornene Carboxylic Acid Methyl Ester/butylnorbornene Addition Copolymer Using Pd(acac)$_2$

5.71 g (37.54 mmol) of the norbornene carboxylic acid methyl ester prepared in Example 1, 13.05 g (87.58 mmol) of butylnorbornene, and 36 mL of purified toluene solvent were put in a 250 mL Schlenk flask. Then, 3.81 mg of Pd(acac)$_2$ catalyst dissolved in 5 mL of toluene, 3.51 mg of tricyclohexylphosphine cocatalyst, and 20.0 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 16.21 g of norbornene carboxylic acid methyl ester/butylnorbornene copolymer (yield: 86.4 mol % of used monomer). The number-average molecular weight (Mn) of the polymer was 75,000, and the weight-average molecular weight (Mw) was 174,000.

Example 14

Preparation of Norbornene Carboxylic Acid Methyl Ester/butylnorbornene Addition Copolymer Using Pd(acac)$_2$

10.46 g (68.73 mmol) of the norbornene carboxylic acid methyl ester prepared in Example 1, 10.24 g (6.73 mmol) of butylnorbornene, and 39 mL of purified toluene solvent were put in a 250 mL Schlenk flask. Then, 4.17 mg of Pd(acac)$_2$ catalyst dissolved in 5 mL of toluene, 3.86 mg of tricyclohexylphosphine cocatalyst, and 22.1 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.15 g of norbornene carboxylic acid methyl ester/butylnorbornene copolymer (yield: 73.2 mol % of used monomer). The number-average molecular weight (Mn) of the polymer was 62,000, and the weight-average molecular weight (Mw) was 140,000.

Example 15

Preparation of Norbornene Carboxylic Acid Methyl Ester/butylnorbornene Addition Copolymer Using Pd(acac)$_2$

14.64 g (96.22 mmol) of the norbornene carboxylic acid methyl ester prepared in Example 1, 6.14 g (41.24 mmol) of butylnorbornene, and 37 mL of purified toluene solvent were put in a 250 mL Schlenk flask. Then, 4.19 mg of Pd(acac)$_2$ catalyst dissolved in 5 mL of toluene, 3.86 mg of tricyclohexylphosphine cocatalyst, and 22.1 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 12.08 g of norbornene carboxylic acid methyl ester/butylnorbornene copolymer (yield: 58.1 mol % of used monomer). The number-average molecular weight (Mn) of the polymer was 59,000, and the weight-average molecular weight (Mw) was 116,000.

Example 16

Preparation of Norbornene Carboxylic Acid Methyl Ester/butylnorbornene Addition Copolymer Using Pd(acac)$_2$

11.42 g (75.08 mmol) of the norbornene carboxylic acid methyl ester prepared in Example 1, 26.1 g (175.2 mmol) of butylnorbornene, and 77 mL of purified toluene solvent were put in a 250 mL Schlenk flask. Then, 6.72 mg of $Pd(acac)_2$ catalyst dissolved in 5 mL of toluene, 7.02 mg of tricyclohexylphosphine cocatalyst, and 40.0 mg of dimethylanilinium tetrakis(pentafluorophenyl)borate cocatalyst dissolved in 2 mL of $CH_2Cl_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 32.69 g of norbornene carboxylic acid methyl ester/butylnorbornene copolymer (yield: 87.1 mol % of used monomer). The number-average molecular weight (Mn) of the polymer was 80,000, and the weight-average molecular weight (Mw) was 192,000.

Example 17

Preparation of Norbornene Carboxylic Acid Methyl Ester/butylnorbornene Addition Copolymer Using $Pd(acac)_2$ 20.92 g (137.5 mmol) of the norbornene carboxylic acid methyl ester prepared in Example 1, 20.48 g (137.5 mmol) of butylnorbornene, and 82 mL of purified toluene solvent were put in a 250 mL Schlenk flask. Then, 8.38 mg of $Pd(acac)_2$ catalyst dissolved in 5 mL of toluene, 7.72 mg of tricyclohexylphosphine cocatalyst, and 44.1 mg of dimethylanilinium tetrakis(pentafluorophenyl)borate cocatalyst dissolved in 2 mL of $CH_2Cl_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 29.9 g of norbornene carboxylic acid methyl ester/butylnorbornene copolymer (yield: 72.2 mol % of used monomer). The number-average molecular weight (Mn) of the polymer was 71,000, and the weight-average molecular weight (Mw) was 149,000.

Example 18

Preparation of Norbornene Carboxylic Acid Methyl Ester/butylnorbornene Addition Copolymer Using $Pd(acac)_2$ 29.29 g (192.4 mmol) of the norbornene carboxylic acid methyl ester prepared in Example 1, 12.28 g (82.48 mmol) of butylnorbornene, and 79 mL of purified toluene solvent were put in a 250 mL Schlenk flask. Then, 8.38 mg of $Pd(acac)_2$ catalyst dissolved in 5 mL of toluene, 7.72 mg of tricyclohexylphosphine cocatalyst, and 44.1 mg of dimethylanilinium tetrakis(pentafluorophenyl)borate cocatalyst dissolved in 2 mL of $CH_2Cl_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 22.24 g of norbornene carboxylic acid methyl ester/butylnorbornene copolymer (yield: 53.5 mol % of used monomer). The number-average molecular weight (Mn) of the polymer was 62,000, and the weight-average molecular weight (Mw) was 126,000.

Example 19

Preparation of Norbornene Carboxylic Acid Methyl Ester/hexylnorbornene Addition Copolymer Using $Pd(acac)_2$ 4.72 g (31.00 mmol) of the norbornene carboxylic acid methyl ester prepared in Example 1, 12.9 g (72.33 mmol) of hexylnorbornene, and 35 mL of purified toluene solvent were put in a 250 mL Schlenk flask. Then, 3.15 mg of $Pd(acac)_2$ catalyst dissolved in 5 mL of toluene, 2.90 mg of tricyclohexylphosphine cocatalyst, and 16.6 mg of dimethylanilinium tetrakis(pentafluorophenyl)borate cocatalyst dissolved in 2 mL of $CH_2Cl_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.7 g of norbornene carboxylic acid methyl ester/hexylnorbornene copolymer (yield: 89.1 mol % of used monomer). The number-average molecular weight (Mn) of the polymer was 95,000, and the weight-average molecular weight (Mw) was 225,000.

Example 20

Preparation of Norbornene Carboxylic Acid Methyl Ester/hexylnorbornene Addition Copolymer Using $Pd(acac)_2$ 9.41 g (61.85 mmol) of the norbornene carboxylic acid methyl ester prepared in Example 1, 11.03 g (61.85 mmol) of hexylnorbornene, and 39 mL of purified toluene solvent were put in a 250 mL Schlenk flask. Then, 3.8 mg of $Pd(acac)_2$ catalyst dissolved in 5 mL of toluene, 3.5 mg of tricyclohexylphosphine cocatalyst, and 20.8 mg of dimethylanilinium tetrakis(pentafluorophenyl)borate cocatalyst dissolved in 2 mL of $CH_2Cl_2$ were added to the flask. Then, reaction carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 16.02 g of norbornene carboxylic acid methyl ester/hexylnorbornene copolymer (yield: 78.4 mol % of used monomer). The number-average molecular weight (Mn) of the polymer was 50,000, and the weight-average molecular weight (Mw) was 136,000.

Example 21

Preparation of Norbornene Carboxylic Acid Methyl Ester/hexylnorbornene Addition Copolymer Using $Pd(acac)_2$ 13.60 g (89.34 mmol) of the norbornene carboxylic acid methyl ester prepared in Example 1, 6.83 g (38.29 mmol) of hexylnorbornene, and 37 mL of purified toluene solvent were put in a 250 mL Schlenk flask. Then, 3.98 mg of $Pd(acac)_2$ catalyst dissolved in 5 mL of toluene, 3.6 mg of tricyclohexylphosphine cocatalyst, and 20.5 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.46 g of norbornene carboxylic acid methyl ester/hexylnorbornene copolymer (yield: 75.7 mol % of used monomer). The number-average molecular weight (Mn) of the polymer was 81,000, and the weight-average molecular weight (Mw) was 185,000.

Example 22

Preparation of Norbornene Carboxylic Acid Methyl Ester/hexylnorbornene Addition Copolymer Using Pd(acac)$_2$ 40.79 g (268.02 mmol) of the norbornene carboxylic acid methyl ester prepared in Example 1, 20.49 g (114.87 mmol) of hexylnorbornene, and 121 mL of purified toluene solvent were put in a 250 mL Schlenk flask. Then, 11.7 mg of Pd(acac)$_2$ catalyst dissolved in 5 mL of toluene, 10.8 mg of tricyclohexylphosphine cocatalyst, and 61.5 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 36.96 g of norbornene carboxylic acid methyl ester/hexylnorbornene copolymer (yield: 60.3 mol % of used monomer). The number-average molecular weight (Mn) of the polymer was 58,400, and the weight-average molecular weight (Mw) was 149,200.

Example 23

Preparation of Norbornene Carboxylic Acid Methyl Ester/octylnorbornene Addition Copolymer Using Pd(acac)$_2$ 4.35 g (28.58 mmol) of the norbornene carboxylic acid methyl ester prepared in Example 1, 13.76 g (66.68 mmol) of octylnorbornene, and 35 mL of purified toluene solvent were put in a 250 mL Schlenk flask. Then, 2.9 mg of Pd(acac)$_2$ catalyst dissolved in 5 mL of toluene, 2.7 mg of tricyclohexylphosphine cocatalyst, and 15.3 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.06 g of norbornene carboxylic acid methyl ester/octylnorbornene copolymer (yield: 83.2 mol % of used monomer). The number-average molecular weight (Mn) of the polymer was 100,000, and the weight-average molecular weight (Mw) was 240,000.

Example 24

Preparation of Norbornene Carboxylic Acid Methyl Ester/octylnorbornene Addition Copolymer Using Pd(acac)$_2$ 8.37 g (54.98 mmol) of the norbornene carboxylic acid methyl ester prepared in Example 1, 11.35 g (54.98 mmol) of octylnorbornene, and 37 mL of purified toluene solvent were put in a 250 mL Schlenk flask. Then, 3.3 mg of Pd(acac)$_2$ catalyst dissolved in 5 mL of toluene, 3.1 mg of tricyclohexylphosphine cocatalyst, and 17.6 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.36 g of norbornene carboxylic acid methyl ester/octylnorbornene copolymer (yield: 77.9 mol % of used monomer). The number-average molecular weight (Mn) of the polymer was 93,000, and the weight-average molecular weight (Mw) was 214,000.

Example 25

Preparation of Norbornene Carboxylic Acid Methyl Ester/octylnorbornene Addition Copolymer Using Pd(acac)$_2$ 12.55 g (82.47 mmol) of the norbornene carboxylic acid methyl ester prepared in Example 1, 7.29 g (35.34 mmol) of octylnorbornene, and 36 mL of purified toluene solvent were put in a 250 mL Schlenk flask. Then, 3.6 mg of Pd(acac)$_2$ catalyst dissolved in 5 mL of toluene, 3.3 mg of tricyclohexylphosphine cocatalyst, and 18.9 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 12.27 g of norbornene carboxylic acid methyl ester/octylnorbornene copolymer (yield: 61.8 mol % of used monomer). The number-average molecular weight (Mn) of the polymer was 74,000, and the weight-average molecular weight (Mw) was 164,000.

Example 26

Preparation of Norbornene Carboxylic Acid Methyl Ester/octylnorbornene Addition Copolymer Using Pd(acac)$_2$ 37.66 g (247.41 mmol) of the norbornene carboxylic acid methyl ester prepared in Example 1, 21.88 g (106.02 mmol) of octylnorbornene, and 118 mL of purified toluene solvent were put in a 250 mL Schlenk flask. Then, 10.8 mg of Pd(acac)$_2$ catalyst dissolved in 5 mL of toluene, 9.9 mg of tricyclohexylphosphine cocatalyst, and 56.6 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 35.05 g of norbornene carboxylic acid methyl ester/octylnorbornene copolymer (yield: 58.9 mol % of used monomer). The number-average molecular weight (Mn) of the polymer was 66,200, and the weight-average molecular weight (Mw) was 175,900.

Example 27

Preparation of Norbornene Carboxylic Acid Methyl Ester/octylnorbornene Addition Copolymer Using Pd(acac)$_2$ 8.37 g (54.98 mmol) of the norbornene carboxylic acid methyl ester prepared in Example 1, 11.35 g (54.98 mmol) of octylnorbornene, and 37 mL of purified chlorobenzene solvent were put in a 250 mL Schienk flask. Then, 3.3 mg of Pd(acac)$_2$ catalyst dissolved in 5 mL of toluene, 3.1 mg of tricyclohexylphosphine cocatalyst, and 17.6 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.06 g of norbornene carboxylic acid methyl ester/octylnorbornene copolymer (yield: 80.1 mol % of used monomer). The number-average molecular weight (Mn) of the polymer was 140,000, and the weight-average molecular weight (Mw) was 577,000.

Example 28

Preparation of Norbornene Carboxylic Acid Methyl Ester/octylnorbornene Addition Copolymer Using Pd(acac)$_2$ 8.37 g (54.98 mmol) of the norbornene carboxylic acid methyl ester prepared in Example 1, 11.35 g (54.98 mmol) of octylnorbornene, and 37 mL of purified toluene solvent were put in a 250 mL Schlenk flask. Then, 3.3 mg of Pd(acac)$_2$ catalyst dissolved in 5 mL of toluene, 3.1 mg of tricyclohexylphosphine cocatalyst, and 17.6 mg of dimethylanilinium tetrakis(pentafluorophenyl)borate cocatalyst dissolved in 2 mL of CH$_2$Cl$_2$ were added to the flask. Then, reaction was carried out at 80° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 13.25 g of norbornene carboxylic acid methyl ester/octylnorbornene copolymer (yield: 67.2 mol % of used monomer). The number-average molecular weight (Mn) of the polymer was 117,000, and the weight-average molecular weight (Mw) was 372,000.

Example 29

Preparation of Norbornene Carboxylic Acid Methyl Ester/octylnorbornene Addition Copolymer Using Pd(acac)$_2$ 8.37 g (54.98 mmol) of the norbornene carboxylic acid methyl ester prepared in Example 1, 11.35 g (54.98 mmol) of octylnorbornene, and 37 mL of purified toluene solvent were put in a 250 mL Schlenk flask. Then, 3.3 mg of Pd(acac)$_2$ catalyst dissolved in 5 mL of toluene, 3.1 mg of tricyclohexylphosphine cocatalyst, and 17.6 mg of dimethylanilinium tetrakis(pentafluorophenyl)borate cocatalyst dissolved in 2 mL of CH$_2$Cl$_2$ were added to the flask. Then, reaction was carried out at 110° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 17.58 g of norbornene carboxylic acid methyl ester/octylnorbornene copolymer (yield: 89.1 mol % of used monomer). The number-average molecular weight (Mn) of the polymer was 56,000, and the weight-average molecular weight (Mw) was 152,000.

Example 30

Preparation of Norbornene Carboxylic Acid Methyl Ester/octylnorbornene Addition Copolymer Using Pd(acac)$_2$ 8.37 g (54.98 mmol) of the norbornene carboxylic acid methyl ester prepared in Example 1, 11.35 g (54.98 mmol) of octylnorbornene, and 37 mL of purified toluene solvent were put in a 250 mL Schlenk flask. Then, 3.3 mg of Pd(acac)$_2$ catalyst dissolved in 5 mL of toluene, 3.1 mg of tricyclohexylphosphine cocatalyst, and 17.6 mg of dimethylanilinium tetrakis(pentafluorophenyl)borate cocatalyst dissolved in 2 mL of CH$_2$Cl$_2$ were added to the flask. Then, reaction was carried out at 100° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 16.38 g of norbornene carboxylic acid methyl ester/octylnorbornene copolymer (yield: 83.1 mol % of used monomer). The number-average molecular weight (Mn) of the polymer was 62,000, and the weight-average molecular weight (Mw) was 175,000.

Example 31

Preparation of Norbornene Carboxylic Acid Butyl Ester/butylnorbornene Addition Copolymer Using Pd(acac)$_2$ 15.55 g (80.0 mmol) of the norbornene carboxylic acid butyl ester prepared in Example 2, 11.93 g (80.0 mmol) of butylnorbornene, and 55 mL of purified toluene solvent were put in a 250 mL Schlenk flask. Then, 4.9 mg of Pd(acac)$_2$ catalyst dissolved in 5 mL of toluene, 4.5 mg of tricyclohexylphosphine cocatalyst, and 25.6 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 18.1 g of norbornene carboxylic acid butyl ester/butylnorbornene copolymer (yield: 65.9 mol % of used monomer). The number-average molecular weight (Mn) of the polymer was 56,000, and the weight-average molecular weight (Mw) was 132,000.

Example 32

Preparation of Norbornene Carboxylic Acid Butyl Ester/butylnorbornene Addition Copolymer Using Pd(acac)$_2$ 14.58 g (75.0 mmol) of the norbornene carboxylic acid butyl ester prepared in Example 2, 26.09 g (175.1 mmol) of butylnorbomene, and 85 mL of purified toluene solvent were put in a 250 mL Schlenk flask. Then, 7.6 mg of Pd(acac)$_2$ catalyst dissolved in 5 mL of toluene, 7.0 mg of tricyclohexylphosphine cocatalyst, and 40.1 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 32.4 g of norbornene carboxylic acid butyl ester/butylnorbornene copolymer (yield: 79.7 mol % of used monomer). The number-average molecular weight (Mn) of the polymer was 60,000, and the weight-average molecular weight (Mw) was 160,000.

Example 33

Preparation of Norbornene Carboxylic Acid Butyl Ester/butylnorbornene Addition Copolymer Using Pd(acac)$_2$ 29.16 g (150.1 mmol) of the norbornene carboxylic acid butyl ester prepared in Example 2, 9.58 g (64.3 mmol) of butylnorbornene, and 85 mL of purified toluene solvent were put in a 250 mL Schlenk flask. Then, 6.5 mg of Pd(acac)$_2$ catalyst dissolved in 5 mL of toluene, 6.0 mg of tricyclohexylphosphine cocatalyst, and 34.4 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 14.4 g of norbornene carboxylic acid butyl ester/butylnorbornene copolymer (yield: 37.2 mol % of used monomer). The number-average molecular weight (Mn) of the polymer was 52,000, and the weight-average molecular weight (Mw) was 114,000.

Example 34

Preparation of Norbornene Carboxylic Acid Butyl Ester/butylnorbornene Addition Copolymer Using Pd(acac)$_2$ 14.58 g (75.0 mmol) of the norbornene carboxylic acid butyl ester prepared in Example 2, 26.09 g (175.1 mmol) of butylnorbornene, and 85 mL of purified toluene solvent were put in a 250 mL Schienk flask. Then, 5.6 mg of Pd(acac)$_2$ catalyst dissolved in 5 mL of toluene, 7.0 mg of tricyclohexylphosphine cocatalyst, and 40.1 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 32.9 g of norbornene carboxylic acid butyl ester/butylnorbornene copolymer (yield: 80.9 mol % of used monomer). The number-average molecular weight (Mn) of the polymer was 49,000, and the weight-average molecular weight (Mw) was 138,000.

Example 35

Preparation of Norbornene Carboxylic Acid Butyl Ester/butylnorbornene Addition Copolymer Using Pd(acac)$_2$ 29.16 g (150.1 mmol) of the norbornene carboxylic acid butyl ester prepared in Example 2, 9.58 g (64.3 mmol) of butylnorbornene, and 85 mL of purified toluene solvent were put in a 250 mL Schlenk flask. Then, 4.8 mg of Pd(acac)$_2$ catalyst dissolved in 5 mL of toluene, 6.0 mg of tricyclohexylphosphine cocatalyst, and 34.4 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 17.97 g of norbornene carboxylic acid butyl ester/butylnorbornene copolymer (yield: 46.4 mol % of used monomer). The number-average molecular weight (Mn) of the polymer was 44,000, and the weight-average molecular weight (Mw) was 100,000.

Example 36

Preparation of Norbornene Carboxylic Acid Methyl Ester Addition Homopolymer Using Pd(acac)$_2$ 40.0 g (262.8 mmol) of the norbornene carboxylic acid methyl ester prepared in Example 1, and 75 mL of purified toluene solvent were put in a 250 mL Schlenk flask. Then, 16.0 mg of Pd(acac)$_2$ catalyst dissolved in 5 mL of toluene, 14.7 mg of tricyclohexylphosphine cocatalyst, and 84.2 mg of dimethylanilinium tetrakis(pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 37.0 g of norbornene carboxylic acid methyl ester homopolymer (yield: 92.5 mol % of used monomer). The number-average molecular weight (Mn) of the polymer was 43,600, and the weight-average molecular weight (Mw) was 100,600.

Example 37

Preparation of Norbornene Carboxylic Acid Methyl Ester Addition Homopolymer Using Pd(acac)$_2$

10.0 g (65.7 mmol) of the norbornene carboxylic acid methyl ester prepared in Example 1, and 15 mL of purified toluene solvent were put in a 250 mL Schlenk flask. Then, 2.0 mg of Pd(acac)$_2$ catalyst dissolved in 5 mL of toluene, 1.84 mg of tricyclohexylphosphine cocatalyst, and 10.6 mg of dimethylanilinium tetrakis(pentafluorophenyl)borate cocatalyst dissolved in 2 mL of CH$_2$Cl$_2$ were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 3.34 g of norbornene carboxylic acid methyl ester homopolymer (yield: 33.4 mol % of used monomer). The number-average molecular weight (Mn) of the polymer was 31,700, and the weight-average molecular weight (Mw) was 71,400.

Example 38

Preparation of Norbornene Carboxylic Acid Methyl Ester/norbornene Carboxylic Acid Butyl Ester Addition Copolymer Using Pd(acac)$_2$

30.0 g (197.1 mmol) of the norbornene carboxylic acid methyl ester prepared in Example 1, 16.41 g (84.47 mmol) of the norbornene carboxylic acid butyl ester prepared in Example 2, and 87 mL of purified toluene solvent were put in a 250 mL Schienk flask. Then 17.2 mg of Pd(acac)$_2$ catalyst dissolved in 5 mL of toluene, 15.8 mg of tricyclohexylphosphine cocatalyst, and 90.2 mg of dimethylanilinium tetrakis (pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 38.4 g of norbornene carboxylic acid methyl ester/norbornene carboxylic acid butyl ester copolymer (yield: 82.7 mol % of used monomer). The number-average molecular weight (Mn) of the polymer was 53,000, and the weight-average molecular weight (Mw) was 116,000.

Example 39

Preparation of Norbornene Carboxylic Acid Methyl Ester/norbornene Carboxylic Acid Butyl Ester Addition Copolymer Using Pd(acac)$_2$

10.0 g (65.7 mmol) of the norbornene carboxylic acid methyl ester prepared in Example 1, 12.77 g (65.7 mmol) of the norbornene carboxylic acid butyl ester prepared in Example 2, and 35 mL of purified toluene solvent were put in a 250 mL Schlenk flask. Then, 8.0 mg of Pd(acac)$_2$ catalyst dissolved in 5 mL of toluene, 7.37 mg of tricyclohexylphosphine cocatalyst, and 42.1 mg of dimethylanilinium tetrakis (pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 19.16 g of norbornene carboxylic acid methyl ester/norbornene carboxylic acid butyl ester copolymer (yield: 84.1 mol % of used monomer). The number-average molecular weight (Mn) of the polymer was 46,000, and the weight-average molecular weight (Mw) was 94,000.

Example 40

Preparation of Norbornene Carboxylic Acid Butyl Ester Addition Homopolymer Using Pd(acac)$_2$

10 g (51.47 mmol) of the norbornene carboxylic acid butyl ester prepared in Example 2, and 5 mL of purified toluene solvent were put in a 250 mL Schlenk flask. Then, 3.14 mg of Pd(acac)$_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of CH$_2$Cl$_2$ were added to the flask. Then, reaction was carried out at 80° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.58 g of norbornene carboxylic acid butyl ester homopolymer (yield: 25.8 mol % of used monomer). The number-average molecular weight (Mn) of the polymer was 62,000, and the weight-average molecular weight (Mw) was 112,000.

Example 41

Preparation of Norbornene Carboxylic Acid Butyl Ester Addition Homopolymer Using Pd(acac)$_2$

10 g (51.47 mmol) of the norbornene carboxylic acid butyl ester prepared in Example 2, and 5 mL of purified toluene solvent were put in a 250 mL Schlenk flask. Then, 3.14 mg of Pd(acac)$_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of CH$_2$Cl$_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.83 g of norbornene carboxylic acid butyl ester homopolymer (yield: 48.3 mol % of used monomer). The number-average molecular weight (Mn) of the polymer was 45,000, and the weight-average molecular weight (Mw) was 84,000.

Example 42

Preparation of Norbornene Carboxylic Acid Butyl Ester Addition Homopolymer Using Pd(acac)$_2$

10 g (51.47 mmol) of the norbornene carboxylic acid butyl ester prepared in Example 2, and 5 mL of purified toluene solvent were put in a 250 mL Schlenk flask. Then, 3.14 mg of Pd(acac)$_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of CH$_2$Cl$_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 7.48 g of norbornene carboxylic acid butyl ester homopolymer (yield: 74.8 mol % of used monomer). The number-average molecular weight (Mn) of the polymer was 51,000, and the weight-average molecular weight (Mw) was 96,000.

Example 43

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 5 mL of purified toluene solvent were put in a 250 mL Schlenk flask. Then, 3.14 mg of $Pd(acac)_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of $CH_2Cl_2$ were added to the flask. Then, reaction was carried out at 110° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 8.18 g of norbornene carboxylic acid butyl ester homopolymer (yield: 81.8 mol % of used monomer). The number-average molecular weight (Mn) of the polymer was 42,000, and the weight-average molecular weight (Mw) was 75,000.

Example 44

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 3.14 mg of $Pd(acac)_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of $CH_2Cl_2$ were added to the flask. Then, reaction was carried out at 80° C. for 1.7 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 1.35 g of norbornene carboxylic acid butyl ester homopolymer (yield: 13.5 mol % of used monomer). The number-average molecular weight (Mn) of the polymer was 47,000, and the weight-average molecular weight (Mw) was 82,000.

Example 45

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 3.14 mg of $Pd(acac)_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of $CH_2Cl_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.97 g of norbornene carboxylic acid butyl ester homopolymer (yield: 29.7 mol % of used monomer). The number-average molecular weight (Mn) of the polymer was 42,000, and the weight-average molecular weight (Mw) was 75,000.

Example 46

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 3.14 mg of $Pd(acac)_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of $CH_2Cl_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 5.21 g of norbornene carboxylic acid butyl ester homopolymer (yield: 52.1 mol % of used monomer). The number-average molecular weight (Mn) of the polymer was 37,000, and the weight-average molecular weight (Mw) was 70,000.

Example 47

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 3.14 mg of $Pd(acac)_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of $CH_2Cl_2$ were added to the flask. Then, reaction was carried out at 110° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.63 g of norbornene carboxylic acid butyl ester homopolymer (yield: 66.3 mol % of used monomer). The number-average molecular weight (Mn) of the polymer was 33,000, and the weight-average molecular weight (Mw) was 59,000.

Example 48

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 5 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 80° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 1.62 g of norbornene carboxylic acid butyl ester homopolymer (yield: 16.2 mol % of used monomer). The number-average molecular weight (Mn) of the polymer was 46,400, and the weight-average molecular weight (Mw) was 104,900.

Example 49

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 5 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.64 g of norbornene carboxylic acid butyl ester homopolymer (yield: 26.4 mol % of used monomer). The number-average molecular weight (Mn) of the polymer was 37,300, and the weight-average molecular weight (Mw) was 89,000.

Example 50

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 5 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.88 g of norbornene carboxylic acid butyl ester homopolymer (yield: 48.8 mol % of used monomer). The number-average molecular weight (Mn) of the polymer was 31,200, and the weight-average molecular weight (Mw) was 78,600.

Example 51

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 5 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 110° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.28 g of norbornene carboxylic acid butyl ester homopolymer (yield: 62.8 mol % of used monomer). The number-average molecular weight (Mn) of the polymer was 26,400, and the weight-average molecular weight (Mw) was 65,400.

Example 52

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 80° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 1.24 g of norbornene carboxylic acid butyl ester homopolymer (yield: 12.4 mol % of used monomer). The number-average molecular weight (Mn) of the polymer was 42,600, and the weight-average molecular weight (Mw) was 90,900.

Example 53

Preparation of Norbornene Carboxylic Acid Butyl Ester Addition Homopolymer Using $Pd(acac)_2$ 10 g (51.47 mmol) of the norbornene carboxylic acid butyl ester prepared in Example 2, and 15 mL of purified toluene solvent were put in a 250 mL Schlenk flask. Then, 1.57 mg of $Pd(acac)_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of $CH_2Cl_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.24 g of norbornene carboxylic acid butyl ester homopolymer (yield: 22.4 mol % of used monomer). The number-average molecular weight (Mn) of the polymer was 30,500, and the weight-average molecular weight (Mw) was 68,500.

Example 54

Preparation of Norbornene Carboxylic Acid Butyl Ester Addition Homopolymer Using Pd(acac)$_2$

10 g (51.47 mmol) of the norbornene carboxylic acid butyl ester prepared in Example 2, and 15 mL of purified toluene solvent were put in a 250 mL Schlenk flask. Then, 1.57 mg of Pd(acac)$_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of CH$_2$Cl$_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 3.72 g of norbornene carboxylic acid butyl ester homopolymer (yield: 37.2 mol % of used monomer). The number-average molecular weight (Mn) of the polymer was 24,800, and the weight-average molecular weight (Mw) was 61,600.

Example 55

Preparation of Norbornene Carboxylic Acid Butyl Ester Addition Homopolymer Using Pd(acac)$_2$

10 g (51.47 mmol) of the norbornene carboxylic acid butyl ester prepared in Example 2, and 15 mL of purified toluene solvent were put in a 250 mL Schlenk flask. Then, 1.57 mg of Pd(acac)$_2$ catalyst dissolved in 5 mL of toluene, 1.44 mg of tricyclohexylphosphine cocatalyst, and 8.25 mg of dimethylanilinium tetrakis(pentafluorophenyl)borate cocatalyst dissolved in 2 mL of CH$_2$Cl$_2$ were added to the flask. Then, reaction was carried out at 110° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.76 g of norbornene carboxylic acid butyl ester homopolymer (yield: 47.6 mol % of used monomer). The number-average molecular weight (Mn) of the polymer was 25,400, and the weight-average molecular weight (Mw) was 63,200.

Example 56

Preparation of Norbornene Carboxylic Acid Methyl Ester Addition Homopolymer Using Pd(acac)$_2$

20 g (131.4 mmol) of the norbornene carboxylic acid methyl ester prepared in Example 1, and 15 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.17 g of norbornene carboxylic acid methyl ester homopolymer (yield: 75.9 mol % of used monomer).

Example 57

Preparation of Norbornene Carboxylic Acid Methyl Ester Addition Homopolymer Using Pd(acac)$_2$

20 g (131.4 mmol) of the norbornene carboxylic acid methyl ester prepared in Example 1, and 15 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 17.31 g of norbornene carboxylic acid methyl ester homopolymer (yield: 86.6 mol % of used monomer). The number-average molecular weight (Mn) of the polymer was 38,600, and the weight-average molecular weight (Mw) was 88,700.

Example 58

Preparation of Norbornene Carboxylic Acid Methyl Ester Addition Homopolymer Using Pd(acac)$_2$

20 g (131.4 mmol) of the norbornene carboxylic acid methyl ester prepared in Example 1, and 15 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 110 for 17 hours while. stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 18.98 g of norbornene carboxylic acid methyl ester homopolymer (yield: 94.9 mol % of used monomer). The number-average molecular weight (Mn) of the polymer was 29,600, and the weight-average molecular weight (Mw) was 76,800.

Example 59

Preparation of Norbornene Carboxylic Acid Methyl Ester Addition Homopolymer Using Pd(acac)$_2$

20 g (131.4 mmol) of the norbornene carboxylic acid methyl ester prepared in Example 1, and 35 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 90° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 10.83 g of norbornene carboxylic acid methyl ester homopolymer (yield: 54.2 mol % of used monomer). The number-average molecular weight (Mn) of the polymer was 37,700, and the weight-average molecular weight (Mw) was 83,500.

Example 60

Preparation of Norbornene Carboxylic Acid Methyl Ester Addition Homopolymer Using Pd(acac)$_2$ 20 g (131.4 mmol) of the norbornene carboxylic acid methyl ester prepared in Example 1, and 35 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 100° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.07 g of norbornene carboxylic acid methyl ester homopolymer (yield: 75.4 mol % of used monomer). The number-average molecular weight (Mn) of the polymer was 33,800, and the weight-average molecular weight (Mw) was 76,900.

Example 61

Preparation of Norbornene Carboxylic Acid Methyl Ester Addition Homopolymer Using Pd(acac)$_2$ 20 g (131.4 mmol) of the norbornene carboxylic acid methyl ester prepared in Example 1, and 35 mL of purified toluene solvent were put in a 250 mL Schlenk flask. Then, 8.01 mg of Pd(acac)$_2$ catalyst dissolved in 5 mL of toluene, 7.37 mg of tricyclohexylphosphine cocatalyst, and 42.1 mg of dimethylanilinium tetrakis(pentafluorophenyl)borate cocatalyst dissolved in 2 mL of CH$_2$Cl$_2$ were added to the flask. Then, reaction was carried out at 110° C. for 17 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 17.98 g of norbornene carboxylic acid methyl ester homopolymer (yield: 89.9 mol % of used monomer). The number-average molecular weight (Mn) of the polymer was 31,000, and the weight-average molecular weight (Mw) was 69,000.

Example 62

Preparation of Norbornene Carboxylic Acid Methyl Ester Addition Homopolymer Using Unpurified HPLC Level Toluene and Pd(acac)$_2$ 10 g (65.7 mmol) of the norbornene carboxylic acid methyl ester prepared in Example 1, and 15 mL of unpurified HPLC level toluene solvent were put in a 250 mL Schlenk flask. Then, 4.0 mg of Pd(acac)$_2$ catalyst dissolved in 5 mL of unpurified HPLC level toluene, 3.68 mg of tricyclohexylphosphine cocatalyst, and 21.1 mg of dimethylanilinium tetrakis(pentafluorophenyl)borate cocatalyst dissolved in 2 mL of CH$_2$Cl$_2$ were added to the flask. Then, reaction was carried out at 80° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 5.96 g of norbornene carboxylic acid methyl ester homopolymer (yield: 59.6 mol % of used monomer). The number-average molecular weight (Mn) of the polymer was 41,000, and the weight-average molecular weight (Mw) was 91,000.

Example 63

Preparation of Norbornene Carboxylic Acid Methyl Ester Addition Homopolymer Using Pd(acac)$_2$ 10 g (65.7 mmol) of the norbornene carboxylic acid methyl ester prepared in Example 1, and 15 mL of purified toluene solvent were put in a 250 mL Schienk flask. Then, 4.0 mg of Pd(acac)$_2$ catalyst dissolved in 5 mL of toluene, 3.68 mg of tricyclohexylphosphine cocatalyst, and 21.1 mg of dimethylanilinium tetrakis(pentafluorophenyl)borate cocatalyst dissolved in 2 mL of CH$_2$Cl$_2$ were added to the flask. Then, reaction was carried out at 80° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.68 g of norbornene carboxylic acid methyl ester homopolymer (yield: 66.8 mol % of used monomer). The number-average molecular weight (Mn) of the polymer was 52,000, and the weight-average molecular weight (Mw) was 100,000.

Example 64

Preparation of Norbornene Carboxylic Acid Butyl Ester Addition Homopolymer Using HPLC Level Toluene and Pd(acac)$_2$ 10 g (51.47 mmol) of the norbornene carboxylic acid butyl ester prepared in Example 2, and 15 mL of unpurified HPLC level toluene solvent were put in a 250 mL Schlenk flask. Then, 3.14 mg of Pd(acac)$_2$ catalyst dissolved in 5 mL of unpurified HPLC level toluene, 2.89 mg of tricyclohexylphosphine cocatalyst, and 16.5 mg of dimethylanilinium tetrakis(pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.32 g of norbornene carboxylic acid butyl ester homopolymer (yield: 63.2 mol % of used monomer). The number-average molecular weight (Mn) of the polymer was 47,000, and the weight-average molecular weight (Mw) was 88,000.

Example 65

Preparation of Norbornene Carboxylic Acid Butyl Ester Addition Homopolymer Using Pd(acac)$_2$ 10 g (51.47 mmol) of the norbornene carboxylic acid butyl ester prepared in Example 2, and 15 mL of purified toluene solvent were put in a 250 mL Schlenk flask. Then, 3.14 mg of Pd(acac)$_2$ catalyst dissolved in 5 mL of toluene, 2.89 mg of tricyclohexylphosphine cocatalyst, and 16.5 mg of dimethylanilinium tetrakis(pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.78 g of norbornene carboxylic acid butyl ester homopolymer (yield: 67.8 mol % of used monomer). The number-average molecular weight (Mn) of the polymer was 47,000, and the weight-average molecular weight (Mw) was 89,000.

Example 66

Preparation of Norbornene Carboxylic Acid Butyl Ester/norbornene Carboxylic Acid Methyl Ester Addition Copolymer Using Unpurified HPLC Level Toluene and Pd(acac)$_2$ 10 g (51.47 mmol) of the norbornene carboxylic acid butyl ester prepared in Example 2, 3.36 g (22.06 mmol) of the norbornene carboxylic acid methyl ester prepared in Example 1, and 18 mL of unpurified HPLC level toluene solvent were put in a 250 mL Schlenk flask. Then, 4.48 mg of Pd(acac)$_2$ catalyst dissolved in 5 mL of unpurified HPLC level toluene, 4.12 mg of tricyclohexylphosphine cocatalyst, and 23.6 mg of dimethylanilinium tetrakis(pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 10.17 g of norbornene carboxylic acid butyl ester/norbornene carboxylic acid methyl ester copolymer (yield: 76.1 mol % of used monomer). The number-average molecular weight (Mn) of the polymer was 50,000, and the weight-average molecular weight (Mw) was 96,000.

Example 67

Preparation of Norbornene Carboxylic Acid Butyl Ester/norbornene Carboxylic Acid Methyl Ester Addition Copolymer Using Pd(acac)$_2$ 10 g (51.47 mmol) of the norbornene carboxylic acid butyl ester prepared in Example 2, 3.36 g (22.06 mmol) of the norbornene carboxylic acid methyl ester prepared in Example 1, and 18 mL of purified toluene solvent were put in a 250 mL Schlenk flask. Then, 4.48 mg of Pd(acac)$_2$ catalyst dissolved in 5 mL of toluene, 4.12 mg of tricyclohexylphosphine cocatalyst, and 23.6 mg of dimethylanilinium tetrakis(pentafluorophenyl)borate cocatalyst dissolved in 2 mL of CH$_2$Cl$_2$ were added to the flask. Then, reaction was carried out at 80° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 10.06 g of norbornene carboxylic acid butyl ester/norbornene carboxylic acid methyl ester copolymer (yield: 75.3 mol % of used monomer).

Example 68

Preparation of Norbornene Carboxylic Acid Butyl Ester/norbornene Carboxylic Acid Methyl Ester Addition Copolymer Using Pd(acac)$_2$ 3082 g (15.86 mol) of the norbornene carboxylic acid butyl ester prepared in Example 2, 1046 g (6.87 mol) of the norbornene carboxylic acid methyl ester prepared in Example 1, and 7300 g of purified toluene solvent were put in a 40 L reactor. Then, 1.385 g of Pd(acac)$_2$ catalyst dissolved in 1000 g of toluene, 1.275 g of tricyclohexylphosphine cocatalyst, and 7.287 g of dimethylanilinium tetrakis(pentafluorophenyl)borate cocatalyst dissolved in 300 mL of CH$_2$Cl$_2$ were added to the reactor. Then, reaction was carried out at 80° C. for 90 hours while stirring the reactor.

After the reaction was completed, the reaction mixture was added to excess ethanol to obtain a white copolymer precipitate. The precipitate was filtered with a glass funnel and dried in a vacuum oven at 65° C. for 24 hours to obtain 2200 g of norbornene carboxylic acid butyl ester/norbornene carboxylic acid methyl ester copolymer (yield: 53.3 mol % of used monomer). The number-average molecular weight (Mn) of the polymer was 73,000, and the weight-average molecular weight (Mw) was 116,000.

Example 69

Preparation of Tetracyclododecene Methyl Ester Addition Homopolymer Using Pd(acac)$_2$ 3.0 g (13.74 mmol) of the tetracyclododecene methyl ester prepared in Example 8, and 6 mL of purified toluene solvent were put in a 250 mL Schlenk flask. Then, 0.837 mg of Pd(acac)$_2$ catalyst dissolved in 3 mL of CH$_2$Cl$_2$, 0.771 mg of tricyclohexylphosphine cocatalyst, and 4.40 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 1.71 g of tetracyclododecene methyl ester_homopolymer (yield: 57.0 mol % of used monomer). The number-average molecular weight (Mn) of the polymer was 21,000, and the weight-average molecular weight (Mw) was 48,000.

Example 70

Preparation of Norbornene Carboxylic Acid Benzyl Ester Addition Homopolymer Using Pd(acac)$_2$ 10.0 g (43.8 mmol) of the exo-rich (comprising 56 mol % of exo isomer) norbornene benzyl ester prepared in Example 9, and 20 mL of purified toluene solvent were put in a 250 mL Schlenk flask. Then, 0.983 mg of Pd(acac)$_2$ catalyst dissolved in 3 mL of CH$_2$Cl$_2$, 1.23 mg of tricyclohexylphosphine cocatalyst, and 7.02 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.94 g of norbornene benzyl ester homopolymer (yield: 29.4 mol % of used monomer). The number-average molecular weight (Mn) of the polymer was 23,000, and the weight-average molecular weight (Mw) was 101,000.

Example 71

Preparation of Phenyl Norbornene/norbornene Carboxylic Acid Butyl Ester Addition Copolymer Using Pd(acac)$_2$ 4.5 g (26.4 mmol) of the phenyl norbornene prepared in Preparation Example 1, 9.19 g (61.7 mmol) of the norbornene carboxylic acid butyl ester prepared in Example 2, and 30 mL of purified toluene solvent were put in a 250 mL Schlenk flask. Then, 1.98 mg of Pd(acac)$_2$ catalyst dissolved in 3 mL of CH$_2$Cl$_2$, 2.47 mg of tricyclohexylphosphine cocatalyst, and 14.1 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 8.28 g of phenyl norbornene/norbornene carboxylic acid butyl ester copolymer (yield: 60.5 mol % of used monomer). The number-average molecular weight (Mn) of the polymer was 49,000, and the weight-average molecular weight (Mw) was 132,000.

Example 72

Preparation of Phenyl Norbornene/norbornene Carboxylic Acid Butyl Ester Addition Copolymer Using Pd(acac)$_2$ 10.0 g (58.7 mmol) of the phenyl norbornene prepared in Preparation Example 1, 3.75 g (25.2 mmol) of the norbornene carboxylic acid butyl ester prepared in Example 2, and 29 mL of purified toluene solvent were put in a 250 mL Schlenk flask. Then, 1.88 mg of Pd(acac)$_2$ catalyst dissolved in 3 mL of CH$_2$Cl$_2$, 2.35 mg of tricyclohexylphosphine cocatalyst, and 13.45 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 11.75 g of phenyl norbornene/norbornene carboxylic acid butyl ester copolymer (yield: 85.5 mol % of used monomer). The number-average molecular weight (Mn) of the polymer was 120,000, and the weight-average molecular weight (Mw) was 409,000.

Example 73

Preparation of Phenyl Norbornene/norbornene Carboxylic Acid Butyl Ester Addition Copolymer Using Pd(acac)$_2$ 7.0 g (41.1 mmol) of the phenyl norbornene prepared in Preparation Example 1, 6.13 g (41.1 mmol) of the norbornene carboxylic acid butyl ester prepared in Example 2, and 30 mL of purified toluene solvent were put in a 250 mL Schlenk flask. Then, 1.85 mg of Pd(acac)$_2$ catalyst dissolved in 3 mL of CH$_2$Cl$_2$, 2.31 mg of tricyclohexylphosphine cocatalyst, and 13.18 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 9.5 g of phenyl norbornene/norbornene carboxylic acid butyl ester copolymer (yield: 72.4 mol % of used monomer). The number-average molecular weight (Mn) of the polymer was 109,000, and the weight-average molecular weight (Mw) was 265,000.

Example 74

Preparation of Butyl Norbornene/norbornene Carboxylic Acid Butyl Ester Addition Copolymer Using Pd(acac)$_2$ 11.93 g (80.0 mmol) of the butyl norbornene, 15.55 g (80.0 mmol) of the norbornene carboxylic acid butyl ester prepared in Example 2, and 60 mL of purified toluene solvent were put in a 250 mL Schlenk flask. Then, 3.59 mg of Pd(acac)$_2$ catalyst dissolved in 5 mL of CH$_2$Cl$_2$, 4.5 mg of tricyclohexylphosphine cocatalyst, and 25.6 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.23 g of butyl norbornene/norbornene carboxylic acid butyl ester copolymer (yield: 55.4 mol % of used monomer). The number-average molecular weight (Mn) of the polymer was 58,000, and the weight-average molecular weight (Mw) was 131,000.

Example 75

Preparation of Phenyl Norbornene/norbornene Carboxylic Acid Methyl Ester Addition Copolymer Using Pd(acac)$_2$ 7.5 g (44.1 mmol) of the phenyl norbornene prepared in Preparation Example 1, 6.71 g (44.1 mmol) of the norbornene carboxylic acid methyl ester prepared in Example 1, and 60 mL of purified toluene solvent were put in a 250 mL Schlenk flask. Then, 1.98 mg of Pd(acac)$_2$ catalyst dissolved in 3 mL of CH$_2$Cl$_2$, 2.47 mg of tricyclohexylphosphine cocatalyst, and 14.12 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 7.93 g of phenyl norbornene/norbornene carboxylic acid methyl ester copolymer (yield: 55.8 mol % of used monomer). The number-average molecular weight (Mn) of the polymer was 84,000, and the weight-average molecular weight (Mw) was 222,000.

Example 76

Preparation of Phenyl Norbornene/norbornene Carboxylic Acid Methyl Ester Addition Copolymer Using Pd(acac)$_2$ 4.5 g (26.4 mmol) of the phenyl norbornene prepared in Preparation Example 1, 9.39 g (61.7 mmol) of the norbornene carboxylic acid methyl ester prepared in Example 1, and 60 mL of purified toluene solvent were put in a 250 mL Schlenk flask. Then, 1.98 mg of Pd(acac)$_2$ catalyst dissolved in 3 mL of CH$_2$Cl$_2$, 2.47 mg of tricyclohexylphosphine cocatalyst, and 14.12 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.83 g of phenyl norbornene/norbornene carboxylic acid methyl ester copolymer (yield: 34.8 mol % of used monomer). The number-average molecular weight (Mn) of the polymer was 61,000, and the weight-average molecular weight (Mw) was 145,000.

Example 77

Preparation of Norbornene Carboxylic Acid Benzyl Ester Addition Homopolymer Using Pd(acac)$_2$ 5.0 g (21.9 mmol) of the exo-rich (comprising 56 mol % of exo isomer) norbornene benzyl ester prepared in Example 9, and 10 mL of purified toluene solvent were put in a 250 mL Schienk flask. Then, 0.492 mg of Pd(acac)$_2$ catalyst dissolved in 3 mL of CH$_2$Cl$_2$, 0.614 mg of tricyclohexylphosphine cocatalyst, and 3.51 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 1.21 g of norbornene benzyl ester homopolymer (yield: 24.2 mol % of used monomer). The number-average molecular weight (Mn) of the polymer was 26,000, and the weight-average molecular weight (Mw) was 111,000.

Example 78

Preparation of Butyl Norbornene/norbornene Carboxylic Acid Butyl Ester Addition Copolymer Using Pd(acac)$_2$ 11.81 g (75.0 mmol) of butyl norbornene, 14.58 g (75.0 mmol) of the norbornene carboxylic acid butyl ester prepared in Example 2, and 56 mL of purified toluene solvent were put in a 250 mL Schlenk flask. Then, 3.4 mg of Pd(acac)$_2$ catalyst dissolved in 5 mL of CH$_2$Cl$_2$, 4.2 mg of tricyclohexylphosphine cocatalyst, and 24.0 mg of dimethylanilinium tetrakis (pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 15.14 g of butyl norbornene/norbornene carboxylic acid butyl ester copolymer (yield: 58.8 mol % of used monomer). The number-average molecular weight (Mn) of the polymer was 55,000, and the weight-average molecular weight (Mw) was 125,000.

Example 79

Preparation of Butyl Norbornene/norbornene Carboxylic Acid Butyl Ester Addition Copolymer Using Pd(acac)$_2$ and Tricyclohexylphosphine Dissolved in Toluene 2.23 g (15.0 mmol) of butyl norbornene, 2.92 g (15.0 mmol) of the norbornene carboxylic acid butyl ester prepared in Example 2, and 11 mL of purified toluene solvent were put in a 250 mL Schienk flask. Then, 0.674 mg of Pd(acac)$_2$ catalyst dissolved in 3 mL of CH$_2$Cl$_2$, 0.842 mg of tricyclohexylphosphine cocatalyst, and 4.8 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 3.31 g of butyl norbornene/norbornene carboxylic acid butyl ester copolymer (yield: 64.2 mol % of used monomer). The number-average molecular weight (Mn) of the polymer was 57,000, and the weight-average molecular weight (Mw) was 136,000.

Example 80

Preparation of Butyl Norbornene/norbornene Carboxylic Acid Ethyl Ester Addition Copolymer Using Pd(acac)$_2$ 8.07 g (54.1 mmol) of butyl norbornene, 9.00 g (54.1 mmol) of separately-prepared exo-rich (comprising 55.6 mol % of exo isomer) norbornene carboxylic acid ethyl ester, and 37 mL of purified toluene solvent were put in a 250 mL Schlenk flask. Then, 2.43 mg of Pd(acac)$_2$ catalyst dissolved in 5 mL of CH$_2$Cl$_2$, 3.04 mg of tricyclohexylphosphine cocatalyst, and 17.35 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 10.10 g of butyl norbornene/norbornene carboxylic acid ethyl ester copolymer (yield: 59.2 mol % of used monomer). The number-average molecular weight (Mn) of the polymer was 45,000, and the weight-average molecular weight (Mw) was 116,000.

Example 81

Preparation of Norbornene Carboxylic Acid Methyl Ester/norbornene Allyl Acetate Addition Copolymer Using Pd(acac)$_2$ 9.16 g (60.2 mmol) of the norbornene carboxylic acid methyl ester prepared in Example 1, 10.0 g (60.2 mmol) of the norbornene allyl acetate prepared in Preparation Example 2, and 38 mL of purified toluene solvent were put in a 250 mL Schienk flask. Then, 2.7 mg of Pd(acac)$_2$ catalyst dissolved in 5 mL of CH$_2$Cl$_2$, 3.37 mg of tricyclohexylphosphine cocatalyst, and 19.2 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 5.56 g of norbornene carboxylic acid methyl ester/norbornene allyl acetate copolymer (yield: 29.0 mol % of used monomer). The number-average molecular weight (Mn) of the polymer was 53,000, and the weight-average molecular weight (Mw) was 122,000.

Example 82

Preparation of Norbornene Carboxylic Acid Methyl Ester/norbornene Allyl Acetate Addition Copolymer Using Pd(acac)$_2$ 14.96 g (98.3 mmol) of the norbornene carboxylic acid methyl ester prepared in Example 1, 7.0 g (42.1 mmol) of the norbornene allyl acetate prepared in Preparation Example 2, and 43 mL of purified toluene solvent were put in a 250 mL Schlenk flask. Then, 3.15 mg of Pd(acac)$_2$ catalyst dissolved in 5 mL of CH$_2$Cl$_2$, 3.94 mg of tricyclohexylphosphine cocatalyst, and 22.49 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 8.81 g of norbornene carboxylic acid methyl ester/norbornene allyl acetate copolymer (yield: 40.1 mol % of used monomer). The number-average molecular weight (Mn) of the polymer was 41,000, and the weight-average molecular weight (Mw) was 100,000.

Example 83

Preparation of Norbornene Carboxylic Acid Methyl Ester/norbornene Allyl Acetate Addition Copolymer Using Pd(acac)$_2$ 5.89 g (38.7 mmol) of the norbornene carboxylic acid methyl ester prepared in Example 1, 15.0 g (90.2 mmol) of the norbornene allyl acetate prepared in Preparation Example 2, and 41 mL of purified toluene solvent were put in a 250 mL Schlenk flask. Then, 2.89 mg of Pd(acac)$_2$ catalyst dissolved in 5 mL of CH$_2$Cl$_2$, 3.62 mg of tricyclohexylphosphine cocatalyst, and 20.66 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 10.48 g of norbornene carboxylic acid methyl ester/norbornene allyl acetate copolymer (yield: 50.2 mol % of used monomer). The number-average molecular weight (Mn) of the polymer was 59,000, and the weight-average molecular weight (Mw) was 144,000.

Example 84

Preparation of Norbornene Carboxylic Acid Butyl Ester/norbornene Allyl Acetate Addition Copolymer Using Pd(acac)$_2$ 9.35 g (48.1 mmol) of the norbornene carboxylic acid butyl ester prepared in Example 2, 8.0 g (48.1 mmol) of the norbornene allyl acetate prepared in Preparation Example 2, and 35.24 mL of purified toluene solvent were put in a 250 mL Schlenk flask. Then, 2.16 mg of Pd(acac)$_2$ catalyst dissolved in 5 mL of CH$_2$Cl$_2$, 2.70 mg of tricyclohexylphosphine cocatalyst, and 15.42 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 2.89 g of norbornene carboxylic acid butyl ester/norbornene allyl acetate copolymer (yield: 16.4 mol % of used monomer). The number-average molecular weight (Mn) of the polymer was 52,000, and the weight-average molecular weight (Mw) was 97,000.

Example 85

Preparation of Norbornene Carboxylic Acid Butyl Ester/norbornene Allyl Acetate Addition Copolymer Using Pd(acac)$_2$ 15.0 g (77.2 mmol) of the norbornene carboxylic acid butyl ester prepared in Example 2, 5.5 g (33.1 mmol) of the norbornene allyl acetate prepared in Preparation Example 2, and 41.9 mL of purified toluene solvent were put in a 250 mL Schlenk flask. Then, 2.48 mg of Pd(acac)$_2$ catalyst dissolved in 5 mL of CH$_2$Cl$_2$, 3.09 mg of tricyclohexylphosphine cocatalyst, and 17.67 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 4.63 g of norbornene carboxylic acid butyl ester/norbornene allyl acetate copolymer (yield: 16.4 mol % of used monomer). The number-average molecular weight (Mn) of the polymer was 48,000, and the weight-average molecular weight (Mw) was 91,000.

Example 86

Preparation of Norbornene Carboxylic Acid Butyl Ester/norbornene Allyl Acetate Addition Copolymer Using Pd(acac)$_2$ 6.51 g (33.5 mmol) of the norbornene carboxylic acid butyl ester prepared in Example 2, 13.0 g (78.2 mmol) of the norbornene allyl acetate prepared in Preparation Example 2, and 39.4 mL of purified toluene solvent were put in a 250 mL Schlenk flask. Then, 2.51 mg of Pd(acac)$_2$ catalyst dissolved in 5 mL of CH$_2$Cl$_2$, 3.13 mg of tricyclohexylphosphine cocatalyst, and 17.90 mg of dimethylanilinium tetrakis(pentafluorophenyl)borate cocatalyst were added to the flask. Then, reaction was carried out at 90° C. for 18 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 6.65 g of norbornene carboxylic acid butyl ester/norbornene allyl acetate copolymer (yield: 34.1 mol % of used monomer). The number-average molecular weight (Mn) of the polymer was 56,000, and the weight-average molecular weight (Mw) was 113,000.

Example 87

Preparation of Norbornene Carboxylic Acid Butyl Ester Addition Homopolymer Using Pd(acac)$_2$ 68.04 g (350.0 mmol) of the norbornene carboxylic acid butyl ester prepared in Example 2, and 140 mL of purified toluene solvent were put in a 500 mL Schienk flask. Then, 15.72 mg of Pd(acac)$_2$ catalyst dissolved in 10 mL of toluene, 19.64 mg of tricyclohexylphosphine cocatalyst, and 112.23 mg of dimethylanilinium tetrakis(pentafluorophenyl)borate cocatalyst were added to the flask. Then, reaction was carried out at 90° C. for 90 hours while stirring the flask.

After the reaction was completed, the reaction mixture was added to excess ethanol to obtain a white copolymer precipitate. The precipitate was filtered with a glass funnel and dried in a vacuum oven at 65° C. for 24 hours to obtain 55.6 g of norbornene carboxylic acid butyl ester homopolymer (yield: 81.7 mol % of used monomer). The number-average molecular weight (Mn) of the polymer was 32,300, and the weight-average molecular weight (Mw) was 63,900.

Example 88

Preparation of Norbornene Carboxylic Acid Butyl Ester Addition Homopolymer Using Allyl Palladium Chloride Dimer (Using Exo Isomer Only)

2.0 g (10.29 mmol) of norbornene carboxylic acid butyl ester exo isomer, and 2 mL of purified CH$_2$Cl$_2$ solvent were put in a 250 mL Schlenk flask. Then, 7.53 mg of allyl palladium chloride dimer and 15.6 mg of silver hexafluoroantimonate dissolved in 2 mL of CH$_2$Cl$_2$ was added to the flask as a catalyst. After 30 minutes, the precipitate was removed, and the remaining catalyst solution was added. Then, reaction was carried out at room temperature for 17.5 hours while stirring the flask.

After the reaction was completed, 7.79 mg of sodium tetrahydroborate (NaBH$_4$) dissolved in 20 mL of tetrahydrofuran were added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 1.1 g of norbornene carboxylic acid butyl ester homopolymer (yield: 55 wt % of used monomer). The number-average molecular weight (Mn) of the polymer was 45,000, and the weight-average molecular weight (Mw) was 100,000.

Example 89

Preparation of Norbornene Carboxylic Acid Methyl Ester Addition Homopolymer Using Allyl Palladium Chloride Dimer 10 g (64.70 mmol) of the norbornene carboxylic acid methyl ester prepared in Example 1, and 10 mL of purified CH$_2$Cl$_2$ solvent were put in a 250 mL Schienk flask. Then, 0.839 g of allyl palladium chloride dimer and 1.024 g of silver hexafluoroantimonate dissolved in 10 mL of CH$_2$Cl$_2$ were added to the flask as a catalyst. After about 30 minutes, the precipitate was removed, and the remaining catalyst solution was added. Then, reaction was carried out at room temperature for 111 hours while stirring the flask.

After the reaction was completed, 0.402 g of NaBH$_4$ dissolved in 20 mL of tetrahydrofuran was added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 4.08 g of norbornene carboxylic acid methyl ester homopolymer (yield: 40.8 wt % of used monomer). The number-average molecular weight (Mn) of the polymer was 32,000, and the weight-average molecular weight (Mw) was 93,000.

Example 90

Preparation of Norbornene Carboxylic Acid Butyl Ester Addition Homopolymer Using Allyl Palladium Chloride Dimer 10 g (51.47 mmol) of the norbornene carboxylic acid butyl ester prepared in Example 2, and 10 mL of purified CH$_2$Cl$_2$ solvent were put in a 250 mL Schlenk flask. Then, 188 mg of allyl palladium chloride dimer and 495 mg of silver hexafluoroantimonate dissolved in 10 mL of CH$_2$Cl$_2$ were added to the flask as a catalyst. After about 30 minutes, the precipitate was removed, and the remaining catalyst solution was added. Then, reaction was carried out at room temperature for 67 hours while stirring the flask.

After the reaction was completed, 194 mg of NaBH$_4$ dissolved in 20 mL of tetrahydrofuran was added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 8.5 g of norbornene carboxylic acid butyl ester homopolymer (yield: 85 wt % of used monomer). The number-average molecular weight (Mn) of the polymer was 40,000, and the weight-average molecular-weight (Mw) was 30,000.

Example 91

Preparation of Norbornene Carboxylic Acid Butyl Ester Addition Homopolymer Using Allyl Palladium Chloride Dimer 40 g (205.9 mmol) of the norbornene carboxylic acid butyl ester prepared in Example 2, and 70 mL of purified CH$_2$Cl$_2$ solvent were put in a 250 mL Schlenk flask. Then, 0.753 g of allyl palladium chloride dimer and 1.981 g of silver hexafluoroantimonate dissolved in 10 mL of $CH_2Cl_2$ were added to the flask as a catalyst. After about 30 minutes, the precipitate was removed, and the remaining catalyst solution was added. Then, reaction was carried out at room temperature for 65 hours while stirring the flask.

After the reaction was completed, 0.779 g of $NaBH_4$ dissolved in 20 mL of tetrahydrofuran was added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 36 g of norbornene carboxylic acid butyl ester homopolymer (yield: 90 wt % of used monomer). The number-average molecular weight (Mn) of the polymer was 27,000, and the weight-average molecular weight (Mw) was 50,000.

Example 92

Preparation of Norbornene/norbornene Carboxylic Acid Butyl Ester Addition Copolymer Using Allyl Palladium Chloride Dimer 5 g (25.73 mmol) of the norbornene carboxylic acid butyl ester prepared in Example 2, 1.04 g (11.04 mmol) of norbornene, and 10 mL of purified $CH_2Cl_2$ solvent were put in a 250 mL Schlenk flask. Then, 135 mg of allyl palladium chloride dimer and 354 mg of silver hexafluoroantimonate dissolved in 10 mL of $CH_2Cl_2$ were added to the flask as a catalyst. After about 30 minutes, the precipitate was removed, and the remaining catalyst solution was added. Then, reaction was carried out at room temperature for 67 hours while stirring the flask.

After the reaction was completed, 139.6 mg of $NaBH_4$ dissolved in 20 mL of tetrahydrofuran was added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 4.92 g of norbornene/norbornene carboxylic acid butyl ester copolymer (yield: 81.5 wt % of used monomer). The number-average molecular weight (Mn) of the polymer was 29,000, and the weight-average molecular weight (Mw) was 78,000.

Example 93

Preparation of Norbornene/norbornene Carboxylic Acid Butyl Ester Addition Copolymer Using Allyl Palladium Chloride Dimer 2 g (10.29 mmol) of the norbornene carboxylic acid butyl ester prepared in Example 2, 0.97 g (10.29 mmol) of norbornene, and 3 mL of purified toluene solvent were put in a 250 mL Schlenk flask. Then, 7.54 mg of allyl palladium chloride dimer and 11.5 mg of tricyclohexylphosphine dissolved in 5 mL of toluene, and 84.7 mg of lithium tetrakis (pentafluorophenyl)borate dissolved in 5 mL of toluene were added to the flask, as catalyst and cocatalyst, respectively. Then, reaction was carried out at 80° C. for 16 hours while stirring the flask.

After the reaction was completed, 7.80 mg of $NaBH_4$ dissolved in 20 mL of tetrahydrofuran was added to the reaction mixture. After stirring for 15 hours at room temperature, the obtained precipitate was filtered with a glass funnel, and the filtrate was added to excess methanol to obtain white copolymer precipitate.

The copolymer was dried in a vacuum oven at 65° C. for 24 hours to obtain 1.20 g of norbornene/norbornene carboxylic acid butyl ester copolymer (yield: 37.7 wt % of used monomer). The number-average molecular weight (Mn) of the polymer was 34,000, and the weight-average molecular weight (Mw) was 77,000.

Comparative Example 5

Radical Polymerization of Norbornene Carboxylic Acid Butyl Ester

The norbornene carboxylic acid butyl ester (3 g, 0.0155 mol) prepared in Example 2 and AIBN (0.25 g, 0.00155 mol) were dissolved in toluene (5 mL). This mixture was reacted at 60° C. for 40 hours while stirring. After the reaction was completed, the reaction mixture was added to excess ethanol, but no polymer was obtained.

Example 94

Surface Tension of Butyl Ester Norbornene Homopolymer

The butyl ester norbornene homopolymer prepared in Example 40 was dissolved in toluene solvent to 20 wt %. The solution was cast on a glass plate and let alone at room temperature for 3 hours. Then, it was dried at 120° C. for 6 hours to obtain a film with a thickness of 120 μm. Surface tension of the film was calculated using the following Equation 3, from the contact angle measurement of $H_2O$ and $CH_2I_2$ (Wu, S. *J. Polym. Sci. C* Vol 34, p 19, 1971).

$$\gamma_S = \gamma_{SL} + \gamma_{LV} \cos\theta \qquad \text{Equation 3}$$

$$\gamma_{SL} = \gamma_S + \gamma_{LV} - 4\left(\frac{\gamma_{LV}^d \gamma_S^d}{\gamma_{LV}^d + \gamma_S^d} + \frac{\gamma_{LV}^p \gamma_S^p}{\gamma_{LV}^p + \gamma_S^p}\right)$$

wherein $\gamma_S$ is the surface tension of the film, $\gamma_{LV}$ is the surface tension of the liquid, $\gamma_{SL}$ is the interfacial tension between the film and the liquid, $\Theta$ is the contact angle, $\gamma^d$ is the dispersion term of the surface tension, and $\gamma^p$ is the polar term of the surface tension.

When water ($\gamma^d$=44.1, $\gamma^p$=6.7 m·N/m) was used, the contact angle was 74.3°, and when diiodomethane ($\gamma^d$=22.1, $\gamma^p$=50.7 m·N/m) was used, the contact angle was 33.5°. From these values, the surface tension was calculated as 49.5 m·N/m.

Example 95

Metal Adhesivity of Butyl Ester Norbornene Homopolymer

The butyl ester norbornene homopolymer prepared in Example 40 was dissolved in toluene to 10 wt %, and coated on a glass plate each having a pattern of chromium, aluminum, and tungsten to a thickness of about 2 μm. The obtained film was cut into a square lattice of 5 mm×5 mm, and a 180° taping test was carried out. None of the three samples showed peeling of the pattern.

Example 96

Adhesivity of Butyl Ester Norbornene Homopolymer Film to PVA Polarizing Film The butyl ester norbornene homopolymer film prepared in Example 95 was corona-treated 3 times at a line speed of 6 m/min with 80 mA, and the contact angle was measured. For water, the contact angle was 20.7°, and for diiodomethane, it was 22°. The surface tension was calculated as 76.9 m·N/m. Within 30 minutes after the corona treatment, a fully dried PVA polarizing film (iodine type, transmittivity=44%) was roll-pressed with 10 wt % of PVA solution. Then, it was dried at 80° C. for 10 minutes. The PVA polarizing panel with the butyl ester norbornene homopolymer film roll-pressed showed a very good adhesivity.

Example 97

DFT (Density Functional Theory) Calculation

The calculations were based on the density functional theory(DFT) at the generalized gradient approximation(GGA) level (Becke's 1988 functional for exchange and Perdew-Wang's 1991 functional for correlation; BPW91[1,2]). A double numerical plus polarization (DNP) basis set was used for C, H, O atoms. The calculations are performed with the Dmol3[3] program.

All the structures of the reactant and the product of exo/endo norbornene were optimized without restriction using analytical gradients of energies, and the transition state structures were obtained by the LST (Complete Linear Synchronous Transit)/QST(Quadratic Synchronous Transit) method. Single point calculations for the reactant, the product, and the transition state were also performed at the optimized geometries using B3LYP/6-311++G(3df,3pd). To gain a better insight into the variations of the energy of the system, the vibrational frequencies and contributions to the Gibbs free energies(GFE) from molecular vibrations, rotations, and transitions were calculated using BPW91/DNP.

At 200° C., it was identified that while the endo isomer is more stable by 0.7 kcal/mol (by GFE) at the transition state, the exo isomer is more stable by 2.0 kcal/mol for the prepared norbornene molecule.

Examples 98 to 100

Preparation of Film

The polymers prepared in Example 63, Example 65, and Example 67 were mixed to prepare a coating solution as in the following Table 1. The coating solution was cast on a glass substrate using a knife coater or a bar coater. Then, the substrate was dried at room temperature for 1 hour, and further dried at 100° C. for 18 hours. The glass plate was kept at −10° C. for 10 seconds, and the film on the glass plate was peeled with a knife to obtain a transparent film whose thickness variation was below 2%. The optical transmittance and thicknesses of the films at 400 to 800 nm are shown in Table 1.

Optical Anisotropy

The refractive index (n) of each transparent film was measured with an Abbe refractometer. The phase difference inside the film ($R_e$) was measured with an automatic birefringence meter (Wang Ja Instruments; KOBRA-21 ADH). The phase difference of the film thickness direction and the x-axis direction inside the film ($R_{th}$) was calculated by the following Equation 4, after measuring the phase difference when the angle between the incident light and the film plane was 50° ($R_\theta$).

$$R_{th} = \frac{R_\theta \times \cos\theta_f}{\sin^2\theta_f} \quad \text{[Equation 4]}$$

The difference of refractive indices ($n_x-n_y$) and ($n_y-n_z$) were calculated by dividing $R_e$ and $R_{th}$ values by the film thickness. ($n_x-n_y$), $R_\theta$, $R_{th}$, and ($n_y-n_z$) values of each transparent film are shown in Table 1.

TABLE 1

| | Composition of film solution | | Physical properties of film | | | | | |
|---|---|---|---|---|---|---|---|---|
| | Polymer | Solvent | | | | | | |
| Classification | (parts by weight) | (parts by weight) | Thickness (μm) | Optical trasmittance (%) | n (refractive index) | $(n_x-n_y) \times 10^3$ | $R_{th}$ (nm/μm) | $(n_y-n_z) \times 10^3$ |
| Example 98 | Polymer of Example 63 100 | THF, 560 | 114 | 92 | 1.52 | 0.008 | 5.78 | 5.78 |
| Example 99 | Polymer of Example 65, 100 | MC 360 & toluene, 200 | 120 | 92 | 1.50 | 0.009 | 2.13 | 2.13 |
| Example 100 | Polymer of Example 67 100 | Toluene, 560 | 103 | 91 | 1.51 | 0.012 | 3.29 | 3.29 |

In Table 1, THF stands for tetrahydrofuran, and MC stands for methylene chloride.

When the triacetate cellulose film ($n_y>n_z$) was overlapped to measure the $R_\theta$ value, all $R_\theta$ values of each film increased. This shows that the films have negative birefringence ($n_y>n_z$) in the film thickness direction.

According to the present invention, a high yield can be obtained by controlling the reaction temperature and reaction time of Diels-Alder reaction of exo-rich norbornene-ester based monomer comprising more than 50 mol % of exo norbornene-ester monomers. When the exo-rich norbornene-ester monomer is polymerized in the presence of a Group X transition metal catalyst system with a specific ligand, a norbornene-ester based addition polymer having a large molecular weight can be obtained in high yield. The prepared norbornene-ester based addition polymer has superior optical characteristics so as to be used for a protection film of a polarizer, a retardation film, or a glass substrate, and has good adhesivity to a variety of substrates.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An exo-rich norbornene-ester addition polymer, comprising norbornene-ester based repeating units derived from norbornene-ester based monomers represented by the following Chemical Formula 1, wherein the exo-rich norbornene-ester based addition polymer has a molecular weight (Mn) larger than 20,000 and comprises more than 50 mol % of exo isomer of the norbornene-ester based monomer repeating units:

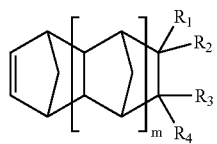

[Chemical Formula 1]

wherein m is an integer of 0 to 4;

at least one of $R_1$, $R_2$, $R_3$, and $R_4$ is a radical having an ester group;

each of the other $R_1$, $R_2$, $R_3$, and $R_4$ is hydrogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; or halogen; and if $R_1$, $R_2$, $R_3$, and $R_4$ are not radicals having an ester group, a hydrogen, or a halogen, $R_1$ and $R_2$, or $R_3$ and $R_4$ are not connected or are connected to form a $C_1$ to $C_{10}$ alkylidene group, or $R_1$ or $R_2$ are not connected or are connected with $R_3$ or $R_4$ to form a $C_4$ to $C_{12}$ saturated or unsaturated cyclic group or a $C_6$ to $C_{17}$ aromatic group, and wherein the norbornene-ester based monomer is the ester of a norbornene based carboxylic acid.

2. The exo-rich norbornene-ester based addition polymer according to claim 1, which is a norbornene-ester homopolymer.

3. The exo-rich norbornene-ester based addition polymer according to claim 1, which is a norbornene-ester based copolymer comprising norbornene-ester based monomer repeating units derived from different norbornene-ester based monomers than are represented by Chemical Formula 1.

4. The exo-rich norbornene-ester based addition polymer according to claim 1, which is a copolymer further comprising repeating units derived from norbornene based monomers not having an ester group.

5. The exo-rich norbornene-ester based addition polymer according to claim 4, wherein the norbornene based monomers not having an ester group are represented by the following Chemical Formula 2:

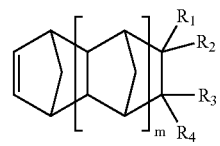

[Chemical Formula 2]

wherein m is an integer of 0 to 4;

each of $R_1$, $R_2$, $R_3$, and $R_4$ is selected from a group consisting of: hydrogen; halogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; $C_1$ to $C_{20}$ linear or branched haloalkyl, haloalkenyl, or halovinyl; $C_5$ to $C_{12}$ halocycloalkyl substituted by hydrocarbon or unsubstituted; $C_6$ to $C_{40}$ haloaryl substituted by hydrocarbon or unsubstituted; $C_7$ to $C_{15}$ haloaralkyl substituted by hydrocarbon or unsubstituted; $C_3$ to $C_{20}$ haloalkynyl; and a non-hydrocarbonaceous polar group having at least one oxygen, nitrogen, phosphorus, sulfur, silicon, or boron atom, independently or simultaneously; and if $R_1$, $R_2$, $R_3$, and $R_4$ are not hydrogen, halogen, or a polar group, $R_1$ and $R_2$, or $R_3$ and $R_4$ are not connected or are connected to form a $C_1$ to $C_{10}$ alkylidene group, or $R_1$ or $R_2$ are not connected or are connected with $R_3$ or $R_4$ to form a $C_4$ to $C_{12}$ saturated or unsaturated cyclic group, or a $C_6$ to $C_{24}$ aromatic group.

6. The exo-rich norbornene-ester based addition polymer according to claim 5, wherein the non-hydrocarbonaceous polar group in Chemical Formula 2 is selected from the group consisting of:

—$OR_6$, —$OC(O)OR_6$, —$R_5OC(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —NCO, $R_5$—NCO, —CN, —$R_5CN$, —NNC(=S)$R_6$, —$R_5NNC(=S)R_6$, —$NO_2$, —$R_5NO_2$,

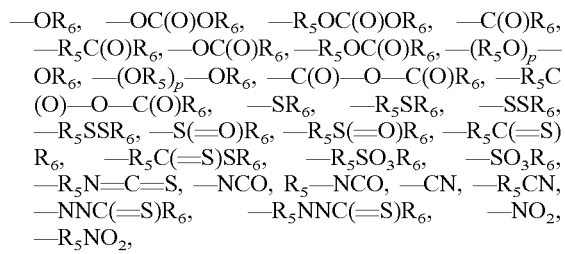

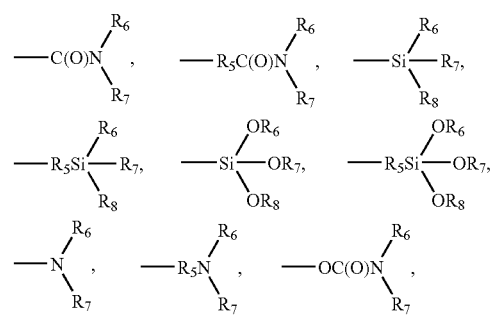

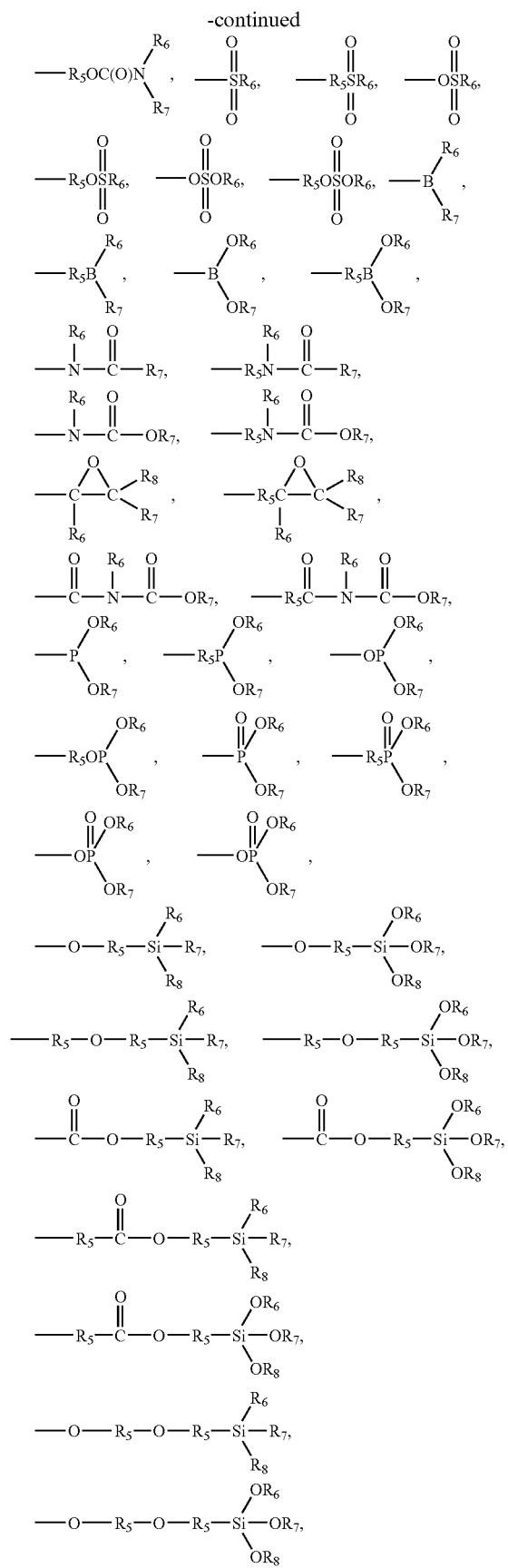
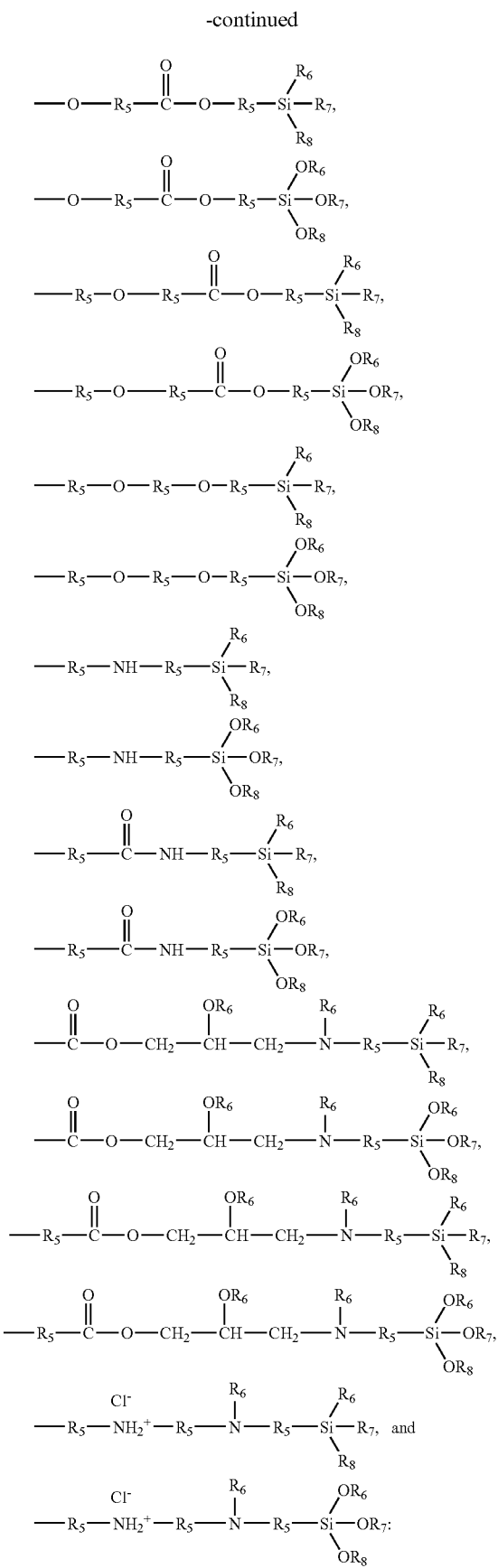

wherein $R_5$ is $C_1$ to $C_{20}$ linear or branched alkyl, haloalkyl, alkenyl, haloalkenyl, vinyl, or halovinyl; $C_4$ to $C_{12}$ cycloalkyl or halocycloalkyl substituted by hydrocarbon or unsubstituted; $C_6$ to $C_{40}$ aryl or haloaryl substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl;

each of $R_6$, $R_7$, and $R_8$ is hydrogen; halogen; $C_1$ to $C_{20}$ linear or branched alkyl, haloalkyl, alkenyl, haloalkenyl, vinyl, halovinyl, alkoxy, haloalkoxy, carbonyloxy, or halocarbonyloxy; $C_4$ to $C_{12}$ cycloalkyl or halocycloalkyl substituted by hydrocarbon or unsubstituted; $C_6$ to $C_{40}$ aryl, haloaryl, aryloxy, or haloaryloxy substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl;

and p is an integer of 1 to 10.

7. A method for preparing norbornene-ester based monomers comprising more than 50 mol % of exo isomer, which comprises a step of carrying out a Diels-Alder reaction of dicyclopentadiene and ester compound at 180 to 260° C. for a duration of time in which the reaction quotient defined by the following Equation 1 ranges from 82,000 to 155,000:

Reaction quotient=[reaction temperature (° C.)]$^2$×log [reaction time (min)], [Equation 1]

wherein the norbornene-ester based monomer prepared by the method is an ester of a norbornene based carboxylic acid.

8. The method according to claim 7, wherein the norbornene-ester based monomers are represented by the following Chemical Formula 1:

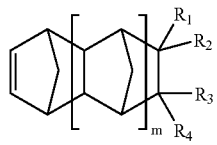

[Chemical Formula 1]

wherein m is an integer of 0 to 4;

at least one of $R_1$, $R_2$, $R_3$, and $R_4$ is a radical having an ester group;

each of the other $R_1$, $R_2$, $R_3$, and $R_4$ is hydrogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; or halogen; and if $R_1$, $R_2$, $R_3$, and $R_4$ are not radicals having an ester group, a hydrogen, or a halogen, $R_1$ and $R_2$, or $R_3$ and $R_4$ are not connected or are connected to form a $C_1$ to $C_{10}$ alkylidene group, or $R_1$ or $R_2$ are not connected or are connected with $R_3$ or $R_4$ to form a $C_4$ to $C_{12}$ saturated or unsaturated cyclic group or a $C_6$ to $C_{17}$ aromatic group.

9. A method for preparing an exo-rich norbornene-ester based addition polymer, which comprises:

a) preparing norbornene-ester monomers comprising more than 50 mol % of exo isomer, wherein the norbornene-ester based monomer is the ester of a norbornene based carboxylic acid; and b) polymerizing the norbornene-ester based monomers prepared in step a) in solution phase in the presence of a catalyst system comprising a Group X transition metal compound with an anionic ligand offering σ- and π-bonds to prepare an exo-rich norbornene-ester based addition polymer having a molecular weight (Mn) larger than 20,000 and comprising more than 50 mol % of exo isomer of the norbornene-ester based monomer repeating units.

10. The method according to claim 9, wherein the step a) proceeds by carrying out a Diels-Alder reaction of dicyclopentadiene and ester compound at 180 to 260° C. for a duration of time in which the reaction quotient defined by the following Equation 1 ranges from 82,000 to 155,000:

Reaction quotient=[reaction temperature (° C.)]$^2$× log [reaction time (min)]. [Equation 1]

11. The method according to claim 9, wherein the norbornene-ester based monomers prepared in step a) comprise norbornene-ester based monomers represented by the following Chemical Formula 1:

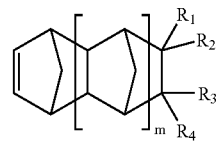

[Chemical Formula 1]

wherein m is an integer of 0 to 4;

at least one of $R_1$, $R_2$, $R_3$, and $R_4$ is a radical having an ester group;

each of the other $R_1$, $R_2$, $R_3$, and $R_4$ is hydrogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; or halogen; and if $R_1$, $R_2$, $R_3$, and $R_4$ are not radicals having an ester group, a hydrogen, or a halogen, $R_1$ and $R_2$, or $R_3$ and $R_4$ are not connected or are connected to form a $C_1$ to $C_{10}$ alkylidene group, or $R_1$ or $R_2$ are not connected or are connected with $R_3$ or $R_4$ to form a $C_4$ to $C_{12}$ saturated or unsaturated cyclic group or a $C_6$ to $C_{17}$ aromatic group.

12. The method according to claim 9, wherein the norbornene-ester based addition polymer prepared in step b) is:

i) a norbornene-ester based addition homopolymer prepared from the same norbornene-ester based monomer; or ii) a norbornene-ester based addition copolymer prepared from different norbornene-ester based monomers.

13. The method according to claim 9, wherein the Group X transition metal compound with an anionic ligand offering σ- and π-bonds of step b) is represented by the following Chemical Formula 3 or Chemical Formula 4:

M(R)$_2$ [Chemical Formula 3]

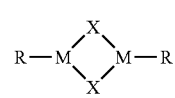

[Chemical Formula 4]

wherein

M is a Group X metal;

X is a halogen; and

R is an anionic ligand offering σ- and π-bonds, such as hydrocarbyl, acetylacetonate [R'C(O)CHC(O)R'] or acetate, wherein each of R' is hydrogen, $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_6$ to $C_{40}$ aryl having an hetero atom; $C_7$ to $C_{15}$ aralkyl substituted by hydrocarbon or unsubstituted; or $C_3$ to $C_{20}$ alkynyl.

14. The method according to claim 9, wherein the catalyst system of step b) comprises 1/2,500 to 1/100,000 of catalyst for the monomer in molar ratio.

15. The method according to claim 9, wherein the catalyst system of step b) further comprises a cocatalyst.

16. The method according to claim 9, wherein the polymerization of step b) is carried out at a temperature range of −100 to 200° C.

17. An optical film comprising the exo-rich norbornene-ester based addition polymer according to claim 1.

18. An optically anisotropic film comprising the exo-rich norbornene-ester based addition polymer according to claim 1.

19. The optically anisotropic film according to claim 18, whose retardation value ($R_{th}$), defined by the following Equation 2, is 70 to 1000 nm:

$$R_{th}=\Delta(n_y-n_z)\times d \qquad \text{[Equation 2]}$$

wherein
$n_y$ is the refractive index in the fast axis direction in a plane measured at a wavelength of 550 nm;
$n_z$ is the refractive index in the thickness direction measured at a wavelength of 550 nm; and
d is the film thickness.

20. The optically anisotropic film according to claim 18 which can be used for a negative C-plate type optical compensation film for LCDs, whose refractive indices satisfy the relationship of $n_x \approx n_y > n_z$ wherein $n_x$=the refractive index in the slow axis direction in a plane; $n_y$=the refractive index in the fast axis direction in a plane; and $n_z$=the refractive index in the thickness direction.

21. The exo-rich norbornene-ester based addition polymer according to claim 1, which is prepared by polymerizing the norbornene-ester based monomers comprising more than 50 mol % of exo isomer in the solution phase in the presence of a catalyst system comprising a Group X transition metal compound with an anionic ligand offering σ- and π-bonds.

22. An exo-rich norbornene-ester based addition polymer having a molecular weight (Mn) larger than 20,000 and comprising more than 50 mol % of exo isomer of the norbornene-ester based monomer repeating units, which is prepared by a method comprising the steps of:
a) preparing norbornene-ester based monomers comprising more than 50 mol % of exo isomer, wherein the norbornene-ester based monomer is the ester of a norbornene based carboxylic acid; and
b) polymerizing the norbornene-ester based monomers prepared by the step a) in solution phase in the presence of a catalyst system comprising a Group X transition metal compound with an anionic ligand offering σ- and π-bonds.

23. The method according to claim 9, wherein the norbornene-ester based monomers of the step a) are copolymerized with a norbornene based monomer not having an ester group to prepare an addition copolymer of a norbornene-ester based monomer and a norbornene based monomer not having an ester group.

24. The method according to claim 23, wherein the norbornene based monomer not having an ester group is represented by the following Chemical Formula 2:

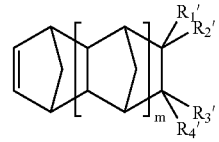

[Chemical Formula 2]

wherein
m is an integer of 0 to 4;
each of $R_1'$, $R_2'$, $R_3'$, and $R_4'$ is selected from a group consisting of: hydrogen; halogen; $C_1$ to $C_{20}$ linear or branched alkyl, alkenyl, or vinyl; $C_5$ to $C_{12}$ cycloalkyl substituted by hydrocarbon or unsubstituted; $C_6$ to $C_{40}$ aryl substituted by hydrocarbon or unsubstituted; $C_7$ to $C_{15}$ aralkyl substituted by hydrocarbon or unsubstituted; $C_3$ to $C_{20}$ alkynyl; $C_1$ to $C_{20}$ linear or branched haloalkyl, haloalkenyl, or halovinyl; $C_5$ to $C_{12}$ halocycloalkyl substituted by hydrocarbon or unsubstituted; $C_6$ to $C_{40}$ haloaryl substituted by hydrocarbon or unsubstituted; $C_7$ to $C_{15}$ haloaralkyl substituted by hydrocarbon or unsubstituted; $C_3$ to $C_{20}$ haloalkynyl; and a non-hydrocarbonaceous polar group having at least one oxygen, nitrogen, phosphorus, sulfur, silicon, or boron atom, independently or simultaneously; and
if $R_1'$, $R_2'$, $R_3'$, and $R_4'$ are not hydrogen, halogen, or a polar group, $R_1'$ and $R_2'$, or $R_3'$ and $R_4'$ are not connected or are connected to form a $C_1$ to $C_{10}$ alkylidene group, or $R_1'$ or $R_2'$ are not connected or are connected with $R_3'$ or $R_4'$ to form a $C_4$ to $C_{12}$ saturated or unsaturated cyclic group, or a $C_6$ to $C_{24}$ aromatic group.

25. The method according to claim 24, wherein the non-hydrocarbonaceous polar group in Chemical Formula 2 is selected from the group consisting of:

—$OR_6$, —$OC(O)OR_6$, —$R_5OC(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$NCO$, $R_5$—$NCO$, —$CN$, —$R_5CN$, —$NNC(=S)R_6$, —$R_5NNC(=S)R_6$, —$NO_2$, —$R_5NO_2$,

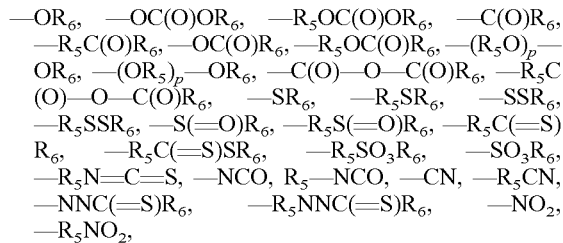

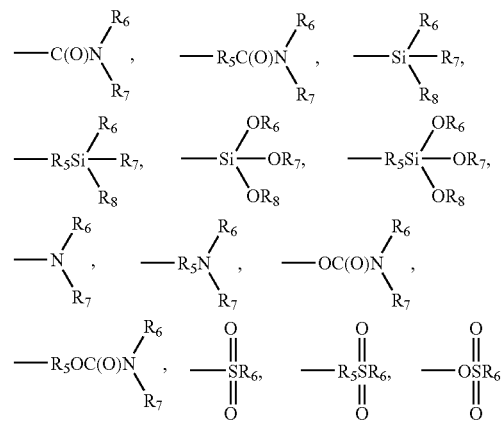

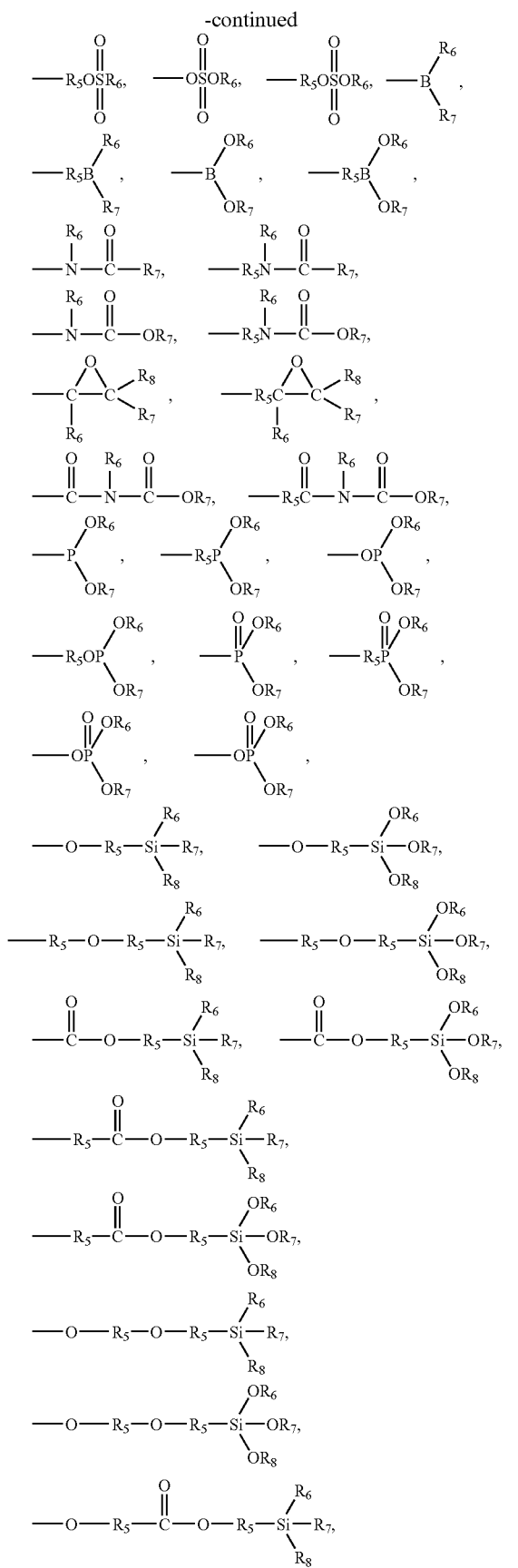
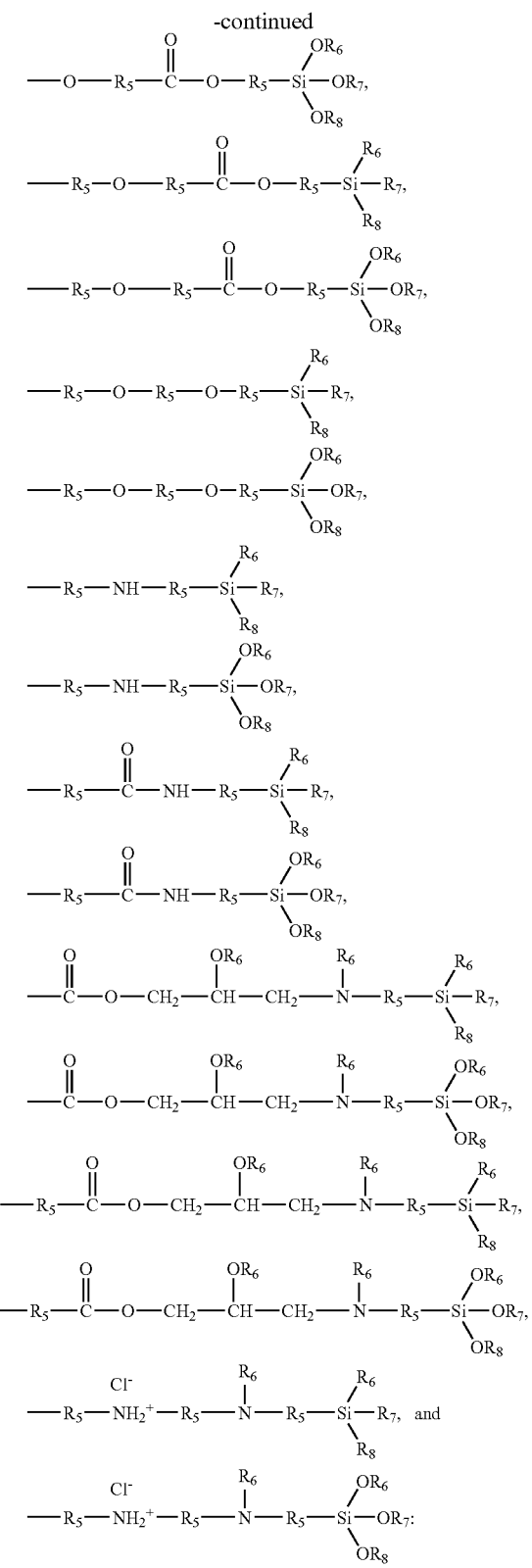
wherein
$R_5$ is $C_1$ to $C_{20}$ linear or branched alkyl, haloalkyl, alkenyl, haloalkenyl, vinyl, or halovinyl; $C_4$ to $C_{12}$ cycloalkyl or halocycloalkyl substituted by hydrocarbon or unsubstituted; $C_6$ to $C_{40}$ aryl or haloaryl substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl;

each of $R_6$, $R_7$, and $R_8$ is hydrogen; halogen; $C_1$ to $C_{20}$ linear or branched alkyl, haloalkyl, alkenyl, haloalkenyl, vinyl, halovinyl, alkoxy, haloalkoxy, carbonyloxy, or halocarbonyloxy; $C_4$ to $C_{12}$ cycloalkyl or halocycloalkyl substituted by hydrocarbon or unsubstituted; $C_6$ to $C_{40}$ aryl, haloaryl, aryloxy, or haloaryloxy substituted by hydrocarbon or unsubstituted; $C_7$ to $C_{15}$ aralkyl or haloaralkyl substituted by hydrocarbon or unsubstituted; or $C_3$ to $C_{20}$ alkynyl or haloalkynyl;

and p is an integer of 1 to 10.

* * * * *